(12) United States Patent
Takenaka et al.

(10) Patent No.: US 7,228,923 B2
(45) Date of Patent: *Jun. 12, 2007

(54) DEVICE FOR ABSORBING FLOOR-LANDING SHOCK FOR LEGGED MOBILE ROBOT

(75) Inventors: Toru Takenaka, Wako (JP); Hiroshi Gomi, Wako (JP); Kazushi Hamaya, Wako (JP); Yoshinari Takemura, Wako (JP); Takashi Matsumoto, Wako (JP); Takahide Yoshiike, Wako (JP); Yoichi Nishimura, Wako (JP); Kazushi Akimoto, Wako (JP); Taro Yokoyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 307 days.

This patent is subject to a terminal disclaimer.

(21) Appl. No.: 10/499,056

(22) PCT Filed: Dec. 11, 2002

(86) PCT No.: PCT/JP02/12980

§ 371 (c)(1),
(2), (4) Date: Jun. 16, 2004

(87) PCT Pub. No.: WO03/055649

PCT Pub. Date: Jul. 10, 2003

(65) Prior Publication Data

US 2005/0011685 A1    Jan. 20, 2005

(30) Foreign Application Priority Data

Dec. 25, 2001  (JP) .............................. 2001-392787

(51) Int. Cl.
*B62D 57/032* (2006.01)
(52) U.S. Cl. .............................. 180/8.6; 623/55; 901/1

(58) Field of Classification Search ................ 180/8.1, 180/8.6; 318/568.11, 568.12, 568.1; 901/1; 623/53–55
See application file for complete search history.

(56) References Cited

U.S. PATENT DOCUMENTS

| | | | |
|---|---|---|---|
| 5,255,753 A * | 10/1993 | Nishikawa et al. | 180/8.6 |
| 5,455,497 A | 10/1995 | Hirose et al. | |
| 6,287,345 B1 * | 9/2001 | Slemker et al. | 623/34 |
| 6,645,253 B2 * | 11/2003 | Caspers | 623/26 |
| 6,967,456 B2 * | 11/2005 | Takenaka et al. | 318/568.12 |

FOREIGN PATENT DOCUMENTS

| | | |
|---|---|---|
| JP | 05-305578 | 11/1993 |
| JP | 06-039755 | 2/1994 |
| JP | 10-277969 | 10/1998 |
| JP | 11-033941 | 2/1999 |
| JP | 11-320461 | 11/1999 |

* cited by examiner

*Primary Examiner*—Anne Marie Boehler
(74) *Attorney, Agent, or Firm*—Rankin, Hill, Porter & Clark LLP

(57) ABSTRACT

A landing shock absorbing device 18 disposed in a foot mechanism 6 of a leg of a robot, wherein an inflatable bag-like member 19 (a variable capacity element) is provided at a ground-contacting face side of the foot mechanism 6. The bag-like member 19 is constructed of an elastic material such as rubber and has a restoring force. An interior portion of the bag-like member 19 is communicated with the atmosphere side through a flow passage 20. During a landing motion of the leg, the bag-like member 19 makes contact with the ground to be compressed, and the air in the interior portion thereof flows out into the atmosphere through the flow passage 20, so that its outflow resistance is generated. Accordingly, a landing shock is reduced. In a lifting state of the leg, the restoring force of the bag-like member 19 allows the bag-like member 19 to be inflated while the air flows into the interior portion thereof. An impact load during the landing of the leg of the legged mobile robot may smoothly be reduced in a light-weight configuration.

14 Claims, 14 Drawing Sheets

FIG. 7
(a)
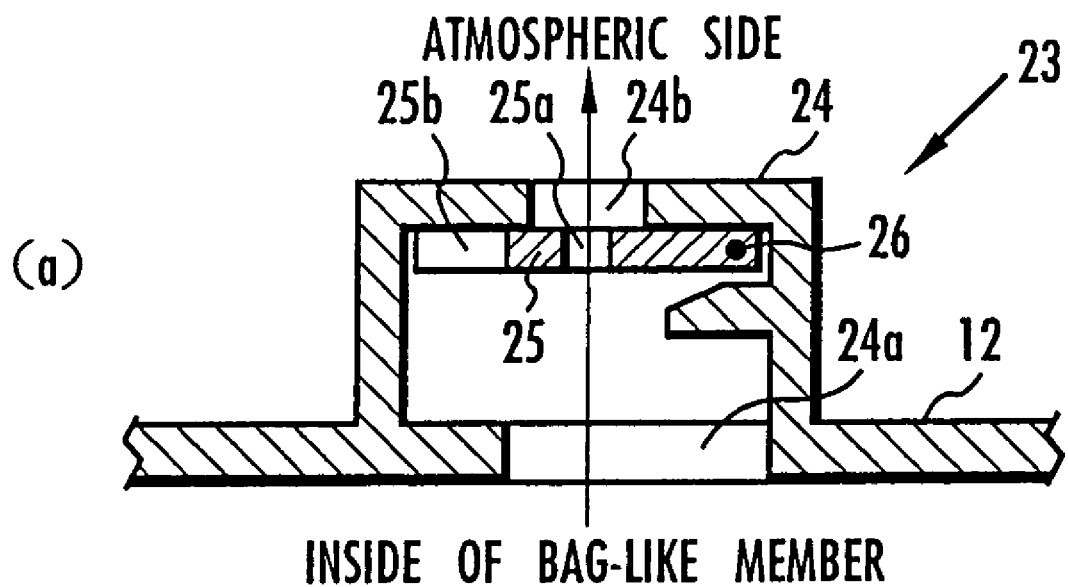
(b)
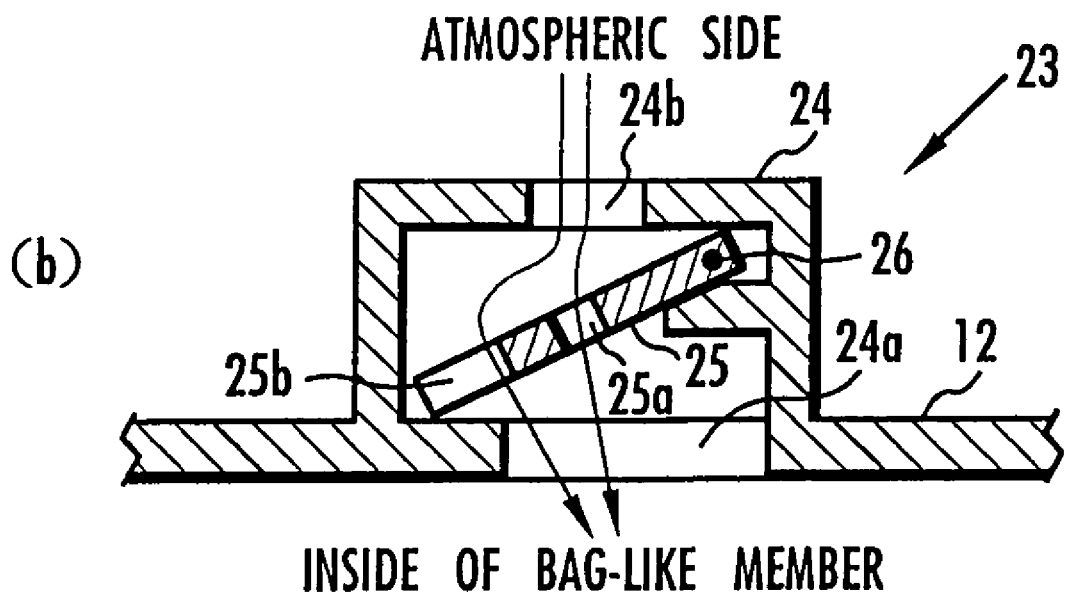

FIG. 20
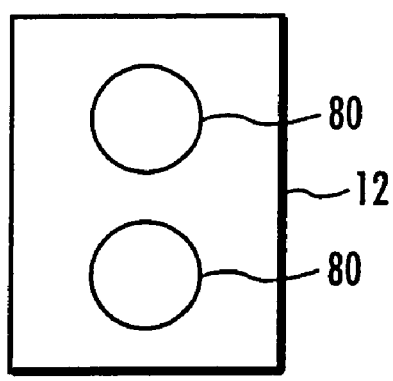
(a)
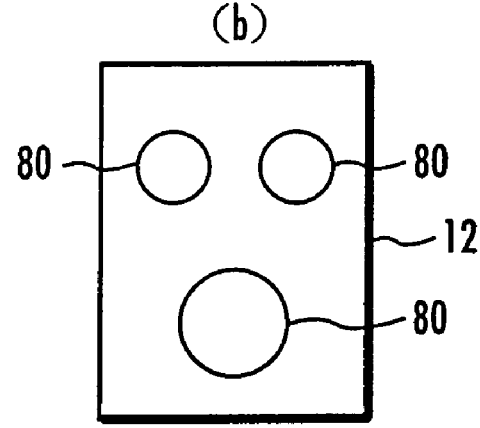
(b)
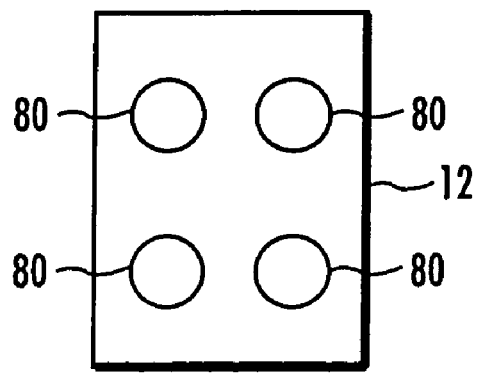
(c)
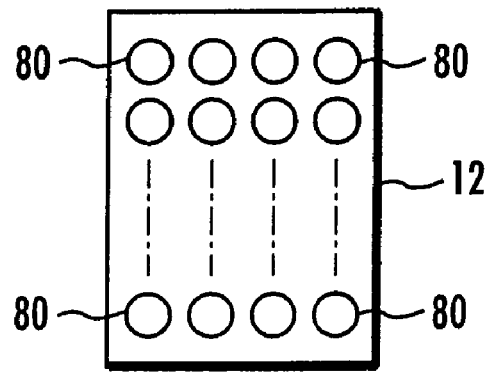
(d)

DEVICE FOR ABSORBING FLOOR-LANDING SHOCK FOR LEGGED MOBILE ROBOT

TECHNICAL FIELD

The present invention relates to a landing shock absorber for reducing an impact load during a landing motion of a leg of a legged mobile robot.

BACKGROUND ART

In a legged mobile robot such as a biped mobile robot equipped with a plurality of legs, each leg is brought into contact with a floor through a ground-contacting face portion of a foot mechanism provided on a far end portion thereof. More particularly, the foot mechanism is a mechanism connected to a joint on the farthest end side of each leg (an ankle joint). The legged mobile robot moves by lifting and landing motions of each leg. More particularly, the lifting and landing motions are a repetition of motions that while at least one leg of a plurality of legs as a supporting leg maintains a foot mechanism of the supporting leg in a ground-contacting state, the other leg as a free leg lifts a foot mechanism of the free leg from its ground-contacting location into the air and moves the same, and make contact with the ground on other ground-contacting location.

In such a legged mobile robot, when a ground-contacting face portion of a foot mechanism of the leg is brought into contact with the ground by the landing motion of each leg, a relatively great impact load (a transient floor reaction force) instantaneously acts through the foot mechanism of the leg. Particularly, when the legged mobile robot is moved at relatively high moving speed, motion energy of the leg in moments immediately before the foot mechanism of the leg makes contact with the ground is great, so that the impact load will be high. When this impact load is high, rigidity of each portion of each leg needs to be enhanced in order to resist the load, and furthermore, this will interfere with a size reduction and a weight reduction of each leg. Accordingly, a reduction (shock absorption) of such an impact load is desired.

As such a shock absorber, for example, the one that the present applicant proposed in Japanese Patent Laid-Open Publication No. 5-305578 is known. In this shock absorber, a cylinder filled with hydraulic oil is provided at a heel of the foot mechanism, and a rod is extendedly provided from a piston slidable in this cylinder toward a bottom face side of the heel of the foot mechanism. A ground-contacting element widened in diameter in a mushroom shape is provided on a tip portion of the rod. Additionally, the piston is energized in a direction that the ground-contacting element projects to the bottom face side of the foot mechanism by a spring accommodated in the cylinder on the upper side thereof. Furthermore, in the piston, a flow passage that allows the hydraulic oil to flow between an upper chamber and a lower chamber thereof is drilled.

In the shock absorber configured in this manner, at the time of the landing motion of the leg, the aforementioned ground-contacting element makes contact with the ground and is pressed with the piston in a direction opposite to an energizing force of the spring. At this moment, while the hydraulic oil in the cylinder flows through the flow passage of the piston, the piston slides in a direction that the piston compresses the spring, and this allows the impact load during the landing motion of the leg to be reduced.

However, in the shock absorber, as a result of the use of the hydraulic oil, particularly, when a moving speed of a robot is fast, pressure of the hydraulic oil suddenly increases at the instant when the ground-contacting element touches the ground. Accordingly, a relatively high impact load tends to be generated at the instant when the ground-contacting element touches the ground. In this situation, when an area of an aperture of the flow passage of the piston is designed to be relatively large, the sudden increase in the pressure of the hydraulic oil at the instant when the ground-contacting element touches the ground may be controlled. However, in a situation like this, a damping effect caused by a flow of the hydraulic oil (an attenuating effect of motion energy) decreases and a vibration of a floor reaction force immediately after the landing motion of the foot mechanism tends to be generated, and resultingly, a posture of the robot tends to be unstable.

Furthermore, in the shock absorber, as a result of the use of the hydraulic oil, weight of the shock absorber will be heavy, resulting in interfering with a weight reduction of the robot. Additionally, the ground-contacting element that makes contact with the ground during the landing motion of the leg can only move in a sliding direction of the piston (an axial center direction of the cylinder) and is a solid body. Consequently, the impact load acting on the ground-contacting element may act in a direction that crosses a movable direction thereof depending on a geometry of a floor, so that the impact load may not adequately be reduced, and a damage of the shock absorber may be generated.

In light of such a background, it is an object of the present invention to provide a landing shock absorber that can smoothly reduce an impact load during a landing motion of a leg of a legged mobile robot with a light-weight configuration.

DISCLOSURE OF INVENTION

To achieve such an object, a landing shock absorbing device of a legged mobile robot of the present invention is characterized in that in the legged mobile robot moving through a ground-contacting face portion of a foot mechanism by lifting and landing motions of a plurality of legs that can make contact with the ground, respectively, a variable capacity element provided in the foot mechanism of the leg to be compressed by undergoing a floor reaction force during the landing motion of each leg and to be inflatable when no longer undergoing the floor reaction force at least by the lifting motion of the leg, thereby allowing compressible fluid to flow into and flow out of an interior portion thereof with the inflation and the compression thereof, and an inflow/outflow means for flowing the compressible fluid into the variable capacity element while inflating the variable capacity element in a lifting state of each leg and flowing the compressible fluid out of the variable capacity element with the compression of the variable capacity element caused by the floor reaction force are provided, and outflow resistance is generated during the outflow of the compressible fluid from the variable capacity element by the inflow/outflow means (a first invention).

Further, in the present invention, the landing motion of each leg denotes a motion for moving down the foot mechanism to allow the ground-contacting face portion to make contact with a floor from a state that the ground-contacting face portion of the foot mechanism of the leg is lifted from the floor, and the lifting motion of each leg denotes a motion for lifting the foot mechanism into the air to remove the ground-contacting face portion from the floor from a state that the ground-contacting face portion of the foot mechanism of the leg is put in contact with the floor. Additionally, the lifting state of each leg or the foot mechanism denotes a state that the entire ground-contacting face portion of the foot mechanism of the leg is removed from the floor. Moreover, the landing state of each leg or the foot mechanism denotes a state that the entire or a partial ground-contacting face portion of the foot mechanism of the leg is put in contact with the floor.

According to the present invention (the first invention), during the landing motion of each leg, the variable capacity element in an inflated state is compressed with the compressible fluid in the interior portion thereof, and resultingly, pressure of the compressible fluid increases. At this time, the pressured compressible fluid in the variable capacity element flows out of the variable capacity element with the outflow resistance by the inflow/outflow means. This allows motion energy of the leg to be attenuated. Additionally, in this situation, some of the motion energy of the leg is transformed to elastic energy of the compressible fluid to be absorbed by a spring property of the compressible fluid, and furthermore, the elastic energy is dissipated by the outflow resistance of the compressible fluid from the variable capacity element. While such an operation prevents a generation of an instantaneous sudden change of the floor reaction force acting on the leg through the variable capacity element and the compressible fluid in the interior portion thereof, the impact load acting on the leg during the landing motion of the leg (the transient floor reaction force) is reduced. Therefore, according to the present invention, the impact load at the time of the landing of the leg may smoothly be reduced and a good shock absorbing effect may be obtained.

Further, as the compressible fluid, gas such as air, fluid or gel containing bubbles, etc., are included. In this situation, particularly, when the gas as the compressible fluid is used, the compressible fluid will be light weight and then the landing shock absorbing device of the present invention may be light weight.

In the present invention (the first invention), the variable capacity element may be provided on a bottom face side of the foot mechanism of the leg to make contact with the ground ahead of the ground-contacting face portion of the foot mechanism of the leg during the landing motion of each leg, or may be placed between the ground-contacting face portion and a joint connected to the foot mechanism (an ankle joint).

More particularly, when the variable capacity element is provided on the bottom face side of the foot mechanism to make contact with the ground ahead of the ground-contacting face portion of the foot mechanism of the leg during the landing motion of each leg, the variable capacity element is preferably constructed of a deformable bag-like member (a second invention). In other words, the bag-like member makes contact with the ground ahead of the ground-contacting face portion of the foot mechanism of the leg to be compressed during the landing motion of each leg. At this moment, the bag-like member can be deformed to meet a surface geometry of the floor, resulting in exerting a shock absorbing function of the landing shock absorbing device of the present invention without depending on a floor shape or the like as long as the bag-like member can make contact with the ground. Consequently, certainty of an impact load reducing effect during the landing of the leg may be enhanced. Additionally, the bag-like member has a high degree of flexibility in the deformation, and hence, even when the floor reaction force acts on the bag-like member from various directions during the landing of each leg, such a situation that the bag-like member is damaged may be avoided.

In the present invention that the variable capacity element is constructed of the bag-like member like this (the second invention), the bag-like member is preferably constructed by using an elastic material to have a restoring force toward an inflating direction thereof (a third invention). That is to say, when the bag-like member itself does not have the restoring force toward the inflating direction thereof, in order to inflate the bag-like member before the landing motion of each leg, it is necessary to actively supply the compressible fluid into the bag-like member by a fluid supplying device, or energize the bag-like member in the inflating direction by a spring or the like different from the bag-like member. Consequently, components needed for the landing shock absorbing device tends to be increased. On the contrary, when the bag-like member itself has the restoring force toward the inflating direction thereof, the bag-like member can suck in the external compressible fluid while inflating by the restoring force thereof, so that its configuration may be simplified by reducing components of the landing shock absorbing device. Particularly, when the air is used as the compressible fluid to carry out inflow and outflow of the air between the bag-like member and the atmosphere, for example, a tank or the like for storing the compressible fluid supplied to the bag-like member will not be needed, either.

Additionally, in the second invention or the third invention, a plurality of the bag-like members are preferably provided (a fourth invention). Accordingly, during the landing motion of the leg, at least one bag-like member may surely be put into contact with the ground to reduce the impact load without depending on a geometry of a floor or the like.

Furthermore, in the second through the fourth inventions, a porous element (for example, a sponge) inflatable together with the bag-like member is preferably accommodated in an interior portion of the bag-like member (a fifth invention). Accordingly, at the time of the compression of the Bag-like member, outflow resistance is generated when the compressible fluid that is entered into holes of the inflatable porous element flows out to an external portion of the holes, and hence, a damping effect of the landing shock absorbing device may be enhanced in cooperation with outflow resistance of the compressible fluid in the bag-like member by the inflow/outflow means.

Additionally, in the present invention (the first through the fifth inventions), the inflow/outflow means is preferably configured in such a manner that inflow resistance of the compressible fluid into the variable capacity element is lower than outflow resistance of the compressible fluid from the variable capacity element (a sixth invention). In other words, the inflow resistance of the compressible fluid into the variable capacity element is lowered, thereby allowing the compressible fluid to quickly flow into the variable capacity element to inflate the variable capacity element in a short time. Accordingly, a situation that the variable capacity element is inadequately inflated may be prevented before the landing of each leg, and then the impact load at the time of the landing motion may properly be reduced. Moreover, the inflow resistance is lowered, thereby reducing energy loss when the variable capacity element is inflated, so that heat may be controlled. In addition, the outflow resistance is increased, thereby allowing the damping effect of the landing shock absorbing device (an attenuating effect of motion energy) to be enhanced, and resultingly, the floor reaction force acting on the leg may be put into a steady state at an early stage.

Additionally, in the present invention (the first through the sixth invention), the inflow/outflow means is preferably provided with upper limit pressure limiting means for limiting pressure in the variable capacity element to no higher than a predetermined upper limit pressure (a seventh invention). Accordingly, when the variable capacity element is compressed during the landing motion of each leg, the pressure in the variable capacity element instantaneously becomes excessively high, and resultingly, a situation that a great force contrarily acts on the leg from the compressible fluid in the variable capacity element may be prevented. Moreover, a situation that the variable capacity element is damaged by excessive pressure can also be prevented by limiting the upper limit of the pressure in the variable capacity element. Further, the upper limit pressure limiting means may be configured by a relief valve connected to the variable capacity element, for example.

In this manner, in the present invention provided with the upper limit pressure limiting means (the seventh invention), the upper limit limiting means is preferably disposed in a manner that the upper limit pressure can variably be adjusted (an eighth invention). Accordingly, the upper limit of the pressure of the compressible fluid in the variable capacity element at the time of the landing motion of the leg may be adjusted depending on a moving pattern of the robot and the like, so that the shock absorbing effect in response to the moving pattern of the robot and the like may be given. Further, in general, as the moving speed of the robot increases, an impact load at the time of the landing of each leg tends to be high. Consequently, in order to effectively reduce the impact load, the upper limit pressure is preferably adjusted to increase the upper limit pressure as the moving speed of the robot increases.

Additionally, in the present invention (the first through the eighth inventions), the inflow/outflow means is preferably disposed in a manner that the outflow resistance of the compressible fluid from the variable capacity element can variably be adjusted (a ninth invention). Accordingly, a characteristic of the variation of the pressure of the compressible fluid in the variable capacity element at the time of the landing motion of the leg may be adjusted depending on the moving pattern of the robot and the like. Further, in general, as the moving speed of the robot increases, an impact load at the time of the landing of each leg tends to be high. Consequently, in order to effectively reduce the impact load, the outflow resistance is preferably increased as the moving speed of the robot increases. In addition, the adjustment of the outflow resistance can be performed by providing a variable throttle valve such as a solenoid proportional valve in a passage for flowing the compressible fluid out of the variable capacity element.

Additionally, in the present invention (the first through the ninth invention), the inflow/outflow means may flow the compressible fluid out of the variable capacity element and flow the compressible fluid into the variable capacity element through respectively independent flow passages, but preferably performs through a common flow passage communicated with the variable capacity element (a tenth invention). Accordingly, a configuration of the inflow/outflow means may be simplified. Further, a flow passage for flowing the compressible fluid into the variable capacity element and a flow passage for flowing the compressible fluid out of the variable capacity element do not need to be entirely common, but may also be partially common (a part of a path of the flow passages). Additionally, valves such as check valves or the like may also be disposed in these flow passages as needed.

Additionally, in the present invention (the first through the tenth invention), the compressible fluid is a gas and the inflow/outflow means is preferably provided with means for increasing pressure in the variable capacity element in an inflated state of the variable capacity element to be higher than atmospheric pressure (an eleventh invention). Accordingly, the pressure of the compressible fluid in the variable capacity element will be high during the landing motion of each leg, thereby allowing the outflow resistance of the compressible fluid to be enhanced, and consequently, the damping effect of the landing shock absorbing device of the present invention may be enhanced. In addition, when the variable capacity element itself does not have a restoring force toward an inflating direction, or even when means such as a spring for energizing the variable capacity element in the inflating direction is not provided, the variable capacity element may be inflated by an inflow of a gas as the compressible fluid into the variable capacity element.

In such a manner, in the present invention (the eleventh invention) that the pressure in the variable capacity element in the inflated state is adapted to be higher than the atmospheric pressure, means for limiting a capacity of the variable capacity element in the inflated state to no more than a predetermined upper limit capacity is preferably provided (a twelfth invention). Accordingly, in a state that the variable capacity element is inflated up to the upper limit capacity, preload will be given to the variable capacity element according to a pressure difference between the pressure in the variable capacity element and the atmospheric pressure. Consequently, during the landing motion of each leg, the pressure in the variable capacity element rises rapidly, and as a result, a peak of the impact load at the time of landing may be controlled to be low. Therefore, the impact load reducing effect may be enhanced.

Further, limitation of the upper limit capacity of the variable capacity element can be done, for example by preventing the variable capacity element from inflating over the upper limit capacity by mechanical means or electromagnetic means, or shutting off the flow passage for flowing the compressible fluid into the variable capacity element when the variable capacity element reaches the upper limit capacity by a valve.

Additionally, in the present invention (the first through the twelfth inventions), the compressible fluid is assumed to be the air and the inflow/outflow means is preferably provided with means for flowing out the air in the variable capacity element to the atmosphere when the variable capacity element is compressed, and flowing the air in the atmosphere into the variable capacity element when the variable capacity element is inflated (a thirteenth invention). Accordingly, the tank or the like for storing the compressible fluid will not be needed, and when the air flows into and out of the variable capacity element, heat generated by the inflow resistance and the outflow resistance can be released into the atmosphere. As a result, a situation that heat is stored in the variable capacity element and the air in the interior portion thereof may be prevented. Furthermore, a damping characteristic of the landing shock absorbing device or the like may be stabilized.

Additionally, the present invention (the fist through the thirteenth inventions) is preferred when the legged mobile robot is a robot that a position and a posture of the foot mechanism is controlled by compliance control so as to allow a moment about an axis in a horizontal direction for the floor reaction force acting on the foot mechanism of each leg (for example, a moment detected by a six-axis force sensor or the like) to follow a predetermined desired moment (a fourteenth invention). That is to say, a spring constant of the compressible fluid is decreased by the pressure of the variable capacity element according to the landing motion of the leg, and consequently, a gain of the control (a compliance gain) may be enhanced, while ensuring stability of a control system for the compliance control. As a result, a following-property of a moment about the axis in the horizontal direction acting on each foot mechanism to the desired moment may be enhanced. Consequently, the stability of the posture of the robot may be ensured, while properly reducing the impact load at the time of the landing. Additionally, in particular, in the aforementioned fourth invention provided with multiple bag-like members, when the compliance control is performed, the moment about the axis in the horizontal direction may be acted on each foot mechanism by a ground contact for any of multiple bag-like members during the landing motion of the leg. Consequently, the stability of the posture of the robot may effectively be ensured by the above compliance control, so that the floor reaction force acting on the leg may be put into a steady state at an early stage.

BRIEF DESCRIPTION OF DRAWINGS

FIG. 7 is a cross sectional view showing a configuration of inflow/outflow means of a landing shock absorbing device of a third embodiment of the present invention.

FIG. 20 is a plan view showing an arrangement configuration for a bag-like member of the landing shock absorbing device of a fourteenth embodiment of the present invention.

BEST MODE OF CARRYING OUT THE INVENTION

Figure 1:
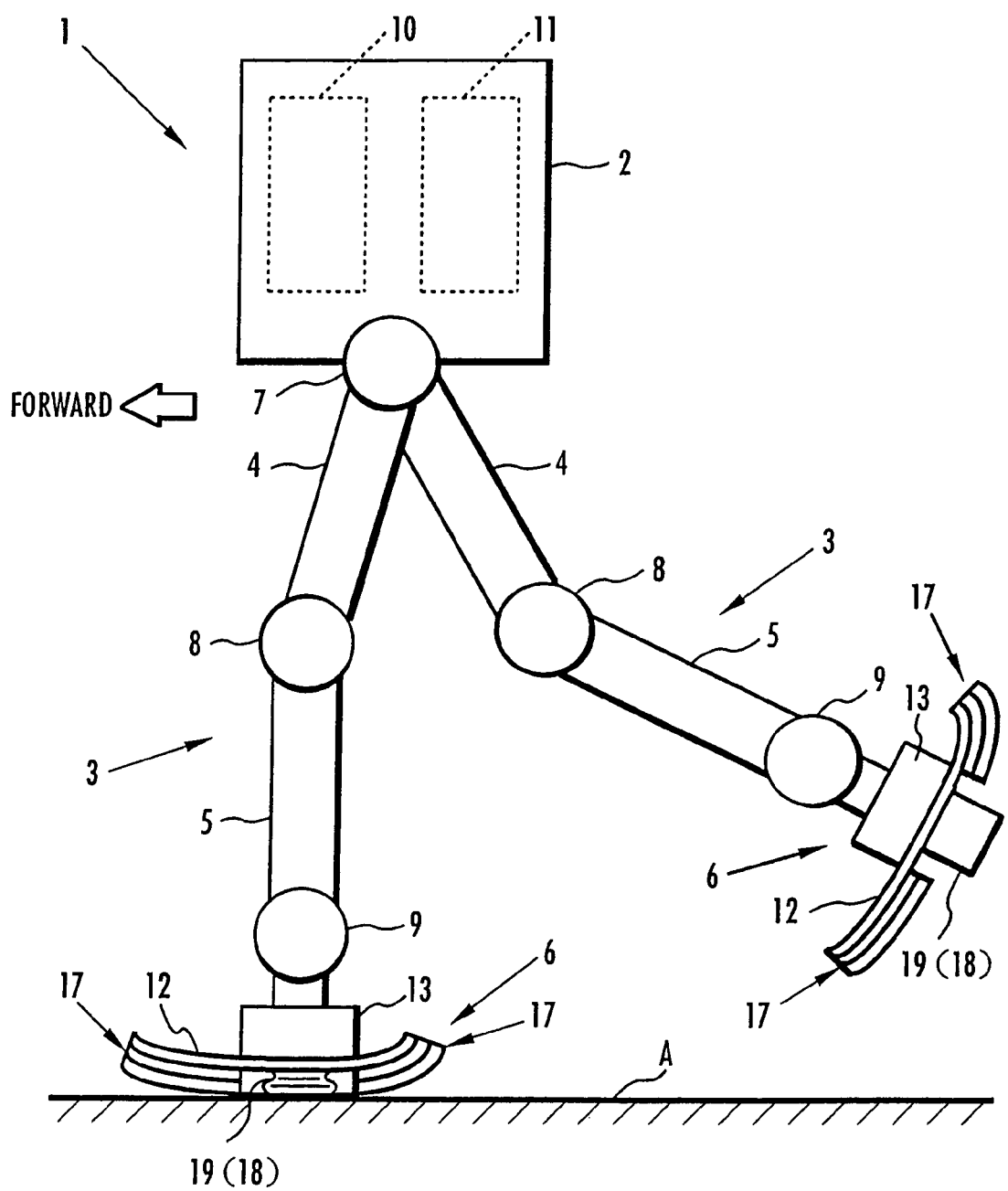
FIG. 1 is a side view showing a basic configuration of a legged mobile robot in an embodiment of the present invention.

Referring to FIGS. 1 through 5, a first embodiment of the present invention is described. FIG. 1 is a side view showing an overall basic configuration of a legged mobile robot 1 of the present embodiment in schematic form. As shown in FIG. 1, for example, the legged mobile robot 1 of the present embodiment is a biped mobile robot comprising a pair of (two) legs 3, 3 extendedly disposed from a lower end portion of its upper body 2 (torso). Further, arms and a head may be attached on the upper body 2.

Each leg 3 is constructed by connecting a thigh 4, a lower leg 5, and a foot mechanism 6 in the order listed through a hip joint 7, a knee joint 8, and an ankle joint 9 from the lower end portion of the upper body 2. More specifically, each leg 3 is adapted to be configured with the thigh 4 extendedly disposed from the lower end portion of the upper body 2 through the hip joint 7, the lower leg 5 connected to a far end portion of the thigh 4 through the knee joint 8, and the foot mechanism 6 connected to a far end portion of the lower leg 5 through the ankle joint 9. Each leg 3 can be brought into contact with a floor A through the foot mechanism 6 presented on a distal end side thereof, and supports the upper body 2 by this ground-contact. In this situation, the hip joint 7 of each leg 3 is adapted to be capable of rotary motions about three axes in an upward/downward direction, a forward/backward direction, and a right/left direction, the knee joint 8 is adapted to be capable of a rotary motion about one axis in the right/left direction, and the ankle joint 9 is adapted to be capable of rotary motions of two axis in the forward/backward direction and the right/left direction of the robot 1. According to the rotary motions of respective joints 7 through 9, each leg 3 is adapted to be capable of performing a movement substantially the same as a human leg.

Additionally, the respective joints 7 through 9 of each leg 3 is provided with an electric motor (not shown) as an actuator for performing the rotary motion about each axis. Furthermore, the upper body 2 of the robot 1 is equipped with a controller 10 for controlling motions of the legs 3, 3 of the robot 1 (a motion control for the electric motor of the respective joints 7 through 9), and a battery 11 as an electric source for a motion of the robot 1, etc. The controller 10 is constructed of an electric circuit including a microcomputer, etc. In this situation, in moving the robot 1, the controller 10 attempts to move the robot 1 like a human by alternately repeating a lifting and a landing motions for the two legs 3, 3. More specifically, a repetition of the lifting and landing motions is an action as follows. In other words, either one of the two legs 3, 3 is taken as a supporting leg and the other as a free leg. In a state that the foot mechanism 6 of the leg 3 on a supporting leg side is landed on the floor A, the foot mechanism 6 of the leg 3 on a free leg side is lifted from the floor A into the air. Furthermore, the foot mechanism 6 of the leg 3 on the free leg side is moved in the air, and then landed on a desired place. The landed leg 3 on the free leg side is, then, newly taken as the supporting leg and the leg 3 which has been taken as the supporting leg is newly taken as the free leg, and the leg 3 newly taken as the free leg is moved as described above. Such a repetition of the motion of the legs 3, 3 is the repetition of the lifting and landing motions of the legs 3, 3 during the movement of the robot 1.

Figure 2:
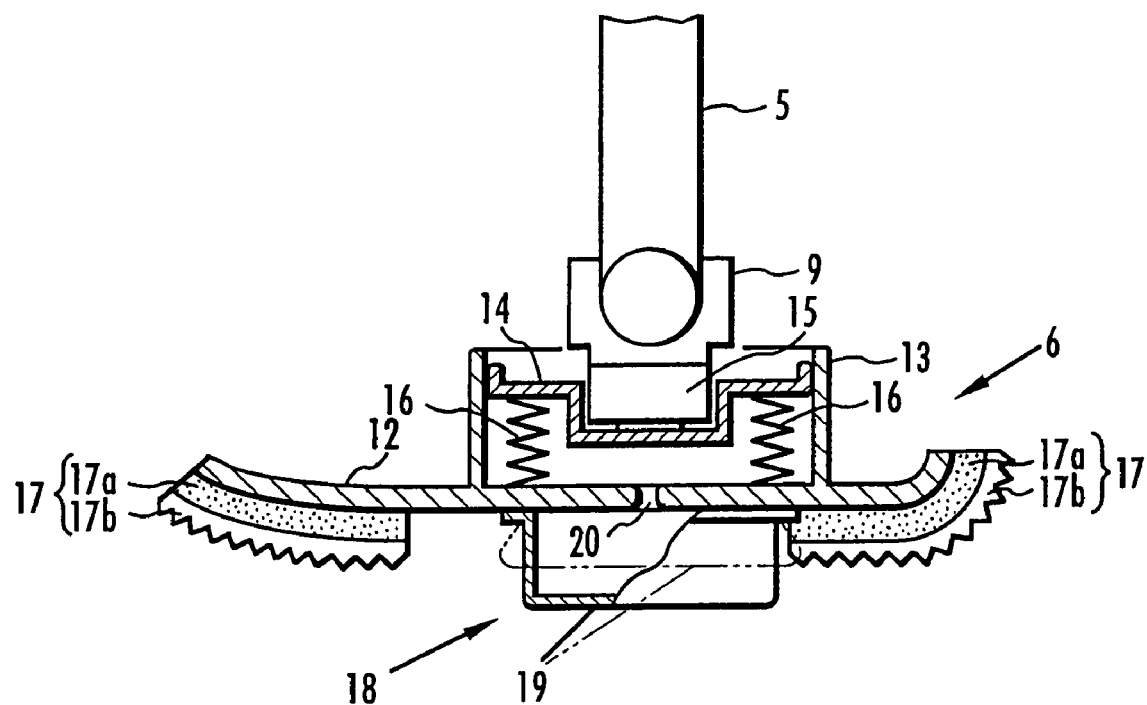
FIG. 2 is a cross sectional view showing a side face of a foot mechanism provided with a landing shock absorbing device of a first embodiment of the present invention.
Figure 3:
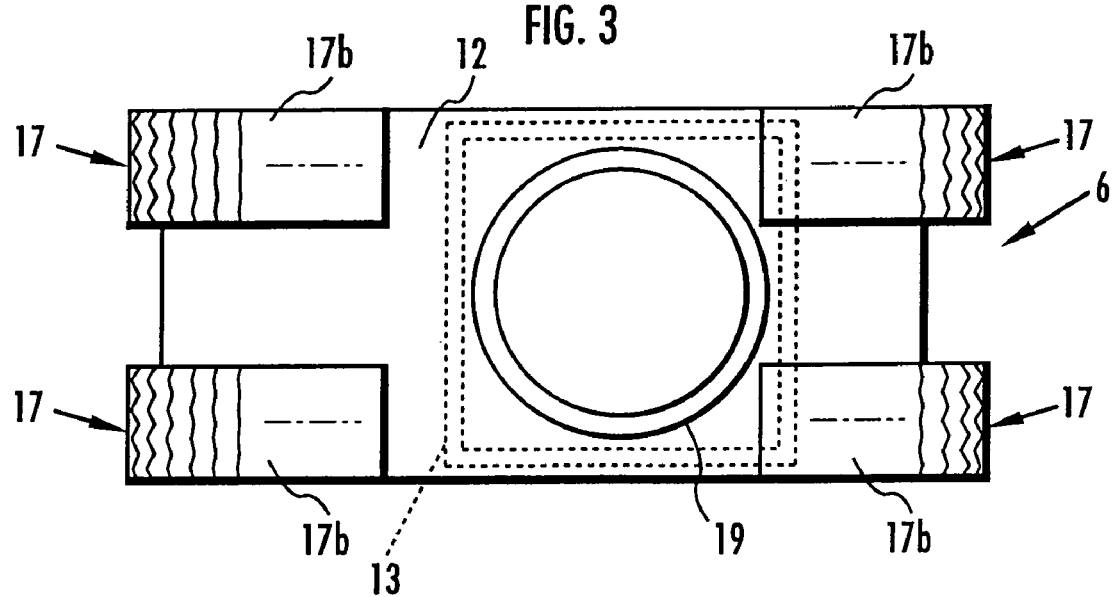
FIG. 3 is a plan view viewed from a bottom face side of the foot mechanism of FIG. 2.

Referring to FIG. 2 and FIG. 3, a configuration of the foot mechanism 6 of each leg 3 is further described. FIG. 2 is a cross sectional view showing a side face of the foot mechanism 6, and FIG. 3 is a plan view viewed from a bottom face side of the foot mechanism 6.

The foot mechanism 6 is provided with a foot plate member 12 in a generally tabular form as a skeletal member. The foot plate member 12 is designed with its front end portion (toe portion) and its rear end portion (heel portion) each curved slightly upward, but otherwise in a flat tabular form. In addition, on a top face portion of the foot plate member 12, a tube member 13 in a cross sectionally rectangular form is fixedly installed with its axis in a vertical direction. In an interior portion of the tube member 13, a movable plate 14, which is disposed to be movable substantially in the vertical direction to be arranged along an inner circumferential surface of the tube member 13, is provided and the movable plate 14 is connected to the ankle joint 9 through a six-axis force sensor 15. The six-axis force sensor 15 detects a floor reaction force acting on the foot mechanism 6 (specifically, a translational force of three axis directions in a forward/backward direction, a right/left direction, and an upward/downward direction, and moment about three axes), and its detected output is input into the controller 10.

Additionally, the movable plate 14 is connected to the top face portion of the foot plate member 12 through a plurality of elastic members 16 (described as a spring in FIG. 2) with a peripheral portion of its lower face constructed of a spring, rubber, or the like. Therefore, the foot plate member 12 is connected to the ankle joint 9 through the elastic member 16, the movable plate 14 and the six-axis force sensor 15. Further, the interior portion of the tube member 13 (a space under the movable plate 14) is opened to an atmospheric side through a hole or a gap which is not shown, so that the air in the atmosphere can freely come into and go out of the interior portion of the tube member 13.

Ground-contacting members 17 are attached to the bottom face (the lower face) of the foot plate member 12. The ground-contacting members 17 are elastic members intervened between the foot plate member 12 and the floor in a state that the foot mechanism 6 is landed (an elastic member that. directly makes contact with the floor), and fixed to four corners of the ground-contacting surface of the foot plate member 12 (both sides of the toe portion and both sides of the heel portion of the foot plate member 12) in the present embodiment. In addition, in the present embodiment, the ground-contacting members 17 are formed in a two-layer structure in which a soft layer 17a made of a relatively soft rubber material and a hard layer 17b made of a relatively hard rubber material are vertically polymerized, and the hard layer 17b is provided on the lowest face side thereof as a ground-contacting face portion directly making contact with the floor during the landing of the leg 3.

The foot mechanism 6 is provided with a landing shock absorbing device 18 associated with the present invention in addition to the above configuration. The landing shock absorbing device 18 is provided with a bag-like member 19 attached to the bottom face of the foot plate member 12, and a flow passage 20 for flowing the air (the air in the atmosphere) as compressible fluid into and out of the interior portion of the bag-like member 19.

The bag-like member 19 is provided substantially in the center portion of the bottom face of the foot plate member 12 in such a manner that the ground-contacting members 17 are presented around a periphery thereof. This bag-like member 19 is deformably structured of an elastic material such as rubber or the like, so that an upwardly opened cylindrical container shape is presented as shown in a solid line in FIG. 2 in a natural state that an elastic deformation is not generated by external forces. The bag-like member 19 is designed with all the opened end portion thereof being firmly fixed on the bottom face of the foot plate member 12 and being shut and covered with the foot plate member 12. Additionally, in a natural state that the bag-like member 19 is presented in the cylindrical container shape, the bottom face of the bag-like member 19 is provided to protrude lower than the ground-contacting members 17. In other words, a height of the bag-like member 19 (a distance from the lower face of foot plate member 12 to the bottom face of the bag-like member 19) is adapted to be taller than a thickness of the ground-contacting members 17. Accordingly, in a state that the foot plate member 12 is brought into contact with the ground through the ground-contacting member 17 (the landed state of the leg 3), the bag-like member 19 is compressed in a height direction of the bag-like member 19 by a floor reaction force, as shown in a phantom line in FIG. 2, or as shown about the leg 3 in the landed state in FIG. 1 (the leg 3 on a forward side of the robot 1 in FIG. 1).

Further, in the present embodiment, the natural state that the bag-like member 19 is presented in the cylindrical container shape is an inflated state of the bag-like member 19. The bag-like member 19 is constructed of the elastic material, resulting in having a shape restoring force into a shape in the natural state (the cylindrical container shape) when compressed.

The flow passage 20 constitutes inflow/outflow means in the present invention, and is a flow-passing hole drilled in the foot plate member 12 to have communication between the interior portion of the bag-like member 19 and the interior portion of the tube member 13 in the present embodiment. In this situation, as described above, the interior portion of the tube member 13 is opened to the atmospheric side, so that the flow passage 20 allows the interior portion of the bag-like member 19 to communicate with the atmospheric side. Therefore, the air in the atmosphere is adapted to freely come into and go out of the interior portion of the bag-like member 19 through the flow passage 20, and in the inflated state (the natural state) of the bag-like member 19, the bag-like member 19 is filled with the air, so that its interior pressure will be equal to atmospheric pressure. In addition, the flow passage 20 is adapted to be a throttled passage, so that fluid resistance will be generated when the air flows into and flows out of the interior portion of the bag-like member 19.

Subsequently, in the present embodiment, a basic motion control of the leg 3 for moving the robot 1 is described. Further, this motion control is described in details in Japanese Patent Laid-Open Publication No. 10-277969, etc. by the present applicant, and hence, only a summary is described herein.

Figure 4:
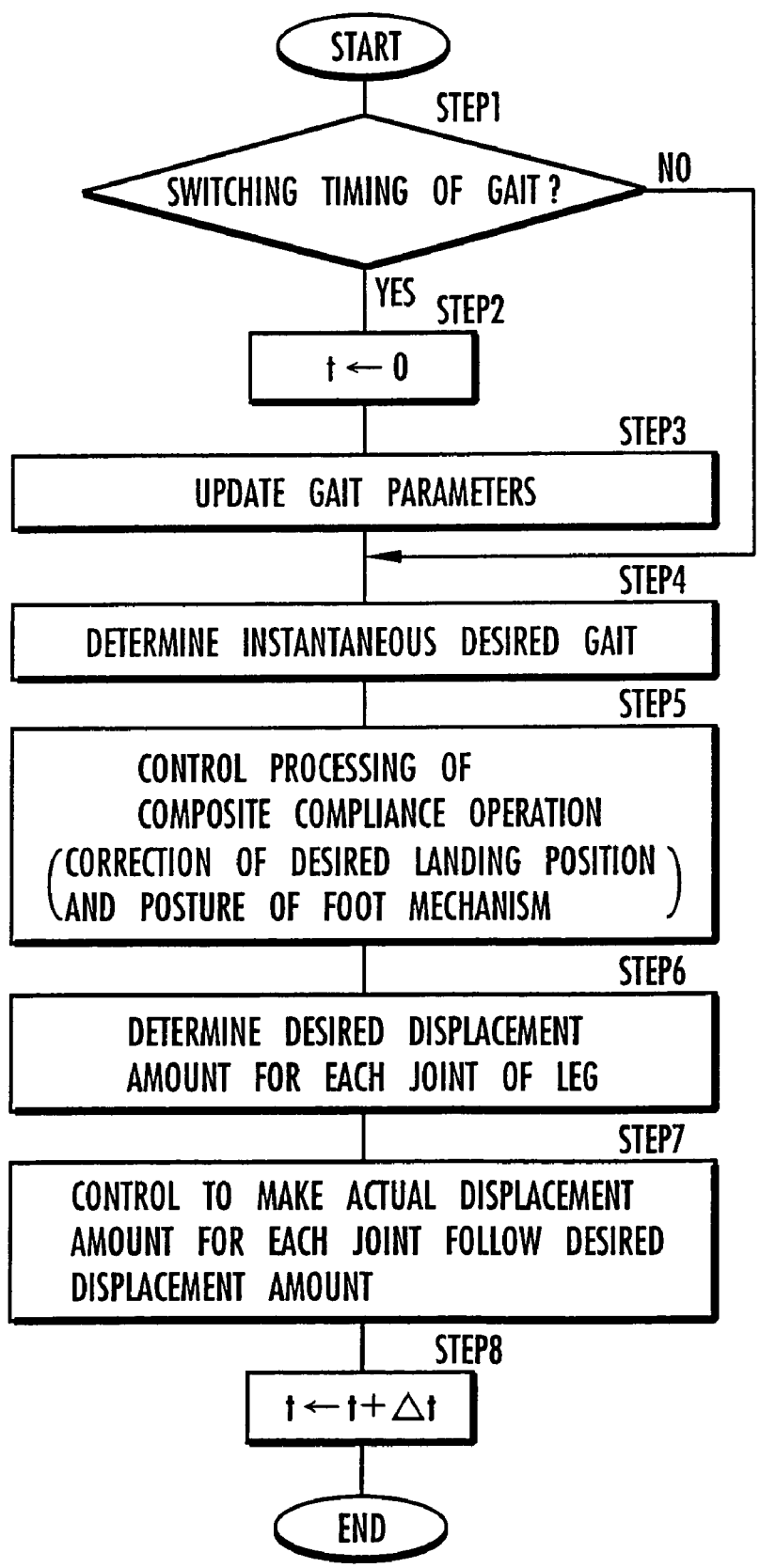
FIG. 4 is a flowchart showing processing for a motion control of the legged mobile robot of FIG. 1.

The controller 10 equipped on the upper body 2 of the robot 1 executes processing shown in a flowchart of FIG. 4 by a predetermined control cycle. In other words, the controller 10 first judges whether or not switching timing is presented for a gait (a walking pattern of the leg 3) of the robot 1 (STEP 1). Here, the switching timing of the gait is switching timing of a supporting leg, and timing when the leg 3 on the free leg side lands on the floor (when the bag-like member 19 of the foot mechanism 6 of the leg 3 makes contact with the ground in the present embodiment) for example. The judgment for this timing is made based on output of the six-axis force sensor 15 or the like for example.

When the switching timing for the gait is presented in STEP 1, after initializing control processing time t to "0" (STEP 2), the controller 10 updates a gait parameter (STEP 3) based on a motion command of the robot 1 externally given and a predetermined movement plan of the robot 1 (a plan prescribed what timing is taken and how the robot 1 is moved, etc.). Here, the gait parameter is a parameter for defining a desired gait for one walking step of the robot 1 and for example, it is a parameter for movement modes of walking, running, and the like, length of a step during the robot 1 is moving, a moving speed (walking cycle), or the like. In addition, the desired gait of the robot 1 is constructed of a desired position and a trajectory of a posture of the upper body 2, a desired position and a trajectory of a posture of the foot mechanism 6 of each leg 3, a desired total floor reaction force (a desired value for a resultant force of a floor reaction force each acting on both the legs 3, 3), a trajectory of a desired ZMP (a desired position of an acting point for the total floor reaction force), and the like. Further, the desired ZMP is more specifically a desired position of an acting point for a total floor reaction force to dynamically counterpoise with a resultant force of an inertia force and gravity acting on the robot 1 depending on a desired motion pattern of the robot 1 defined according to the desired position and the trajectory of the posture of the upper body 2 as well as the desired position and the trajectory of the posture of the foot mechanism 6 of each leg 3 (a total floor reaction force on the same line of action with the resultant force), and a desired position for a point on the floor in such a way that moments (a moment about an axis of a horizontal direction) except a moment about an axis of a vertical direction for the total floor reaction force become "0" (Zero Moment Point).

After setting a new gait parameter in STEP 3 as described above or when it is not the switching timing of the gait in the above-mentioned STEP 1, the controller 10 executes processing of STEP 4 and determines an instantaneous desired gait as a desired gait in a current control cycle based on a gait parameter currently set. That is to say, among the desired gaits for one walking step of the robot 1 defined by the gait parameters currently set, the desired gaits (the desired position and the posture of the upper body 2 in a current time t, the desired position and the posture of each foot mechanism 6, the desired total floor reaction force, and the desired ZMP) in the current control cycle (current time t) are determined as the instantaneous desired gaits.

Subsequently, the controller 10 executes control processing for a composite-compliance operation in STEP 5, and corrects the desired position and the posture of each foot mechanism 6 in the instantaneous desired gaits determined in STEP 4. In this processing for the composite-compliance operation, a moment component of the total floor reaction force (hereinafter referred to as a compensating total floor reaction force's moment) to be generated around the desired ZMP (an acting point of the desired total floor reaction force) to restore the upper body 2 into the desired posture depending on a deviation between the desired posture of the upper body 2 (the desired inclination angle) and an actual inclination angle of the upper body 2 detected according to an output such as a gyro sensor, an acceleration sensor or the like which is not shown is determined. At this point, the compensating total floor reaction force's moment to be determined is a moment about an axis of a horizontal direction, and consists of a moment component about an axis of a forward/backward direction of the robot 1 and a moment component about an axis of a right/left direction. The controller 10 then corrects the desired position and the posture of each foot mechanism 6 such that a resultant force of the actual floor reaction forces (the actual total floor reaction force) for each leg 3 detected by the six-axis force sensor 15 of each leg 3 follows a resultant force between the above compensating total floor reaction force's moment and the desired total floor reaction force within a range that a ground contacting property of the foot mechanism 6 in a ground-contacting state can be secured. In this case, in the aforementioned desired ZMP as the acting point of the desired floor reaction force, the moment component about the axis of the horizontal direction (the forward/backward direction and the right/left direction) for the desired total floor reaction force is "0". Accordingly, the corrections of the desired position and the posture of each foot mechanism 6 are performed to allow the moment component about the axis of the horizontal direction for an actual total floor reaction force to follow the compensating total floor reaction force's moment. Further, in such corrections of the desired position and the posture of each foot mechanism 6, the desired position and the posture of each foot mechanism 6 is corrected so as to compensate influences of elastic deformations of the elastic member 16 and the ground-contacting members 17 during the ground-contact of each foot mechanism 6.

Subsequently, the controller 10 determines desired displacement amounts of respective joints 7 through 9 of the two legs 3, 3 (more specifically, desired rotational angles about each axis of respective joints 7 through 9) (STEP 6) by kinematics arithmetic processing based on geometric models of the robot 1 (rigid link models) according to the desired position and the posture of the upper body 2 of the instantaneous desired gaits determined in the aforementioned STEP 4 and the desired position and the posture of each foot mechanism 6 corrected in STEP 5. The controller 10 then controls torque of an electric motor (not shown) driving the respective joints 7 through 9 so as to make actual displacement amounts of the respective joints 7 through 9 follow the determined desired displacement amount (STEP 7). Further, in this situation, the actual displacement amounts of the respective joints 7 through 9 (actual rotational angles about each axis of respective joints 7 through 9) are detected by rotary encoders or the like equipped in the respective joints 7 through 9. Moreover, the controller 10 increases a control processing time t by a predetermined time $\Delta t$ (time equivalent to a period of a control cycle) (STEP 8) to complete the processing of FIG. 4.

According to the control processing of the controller 10 as has been described, the robot 1 will move in such a way as to follow the desired gaits while autonomously securing stability of its posture.

Subsequently, an operation of a device according to the present embodiment, particularly an operation and an advantage of the landing shock absorbing device 18 is described. During the movement of the robot 1 by the aforementioned control processing of the controller 10, first the bag-like member 19 makes contact with the ground when the leg 3 on the free leg side is landing. The bag-like member 19 is compressed by a floor reaction force acting on the bag-like member 19 with a progress of the landing motion of the leg 3 (a movement of the leg 3 to allow the foot plate member 12 of the foot mechanism 6 to make contact with the ground through the ground-contacting members 17).

At this moment, as the bag-like member 19 is compressed, the air in the bag-like member 19 is compressed and pressurized to be flowed out through the flow passage 20. At this time, outflow resistance of the air is generated in the flow passage 20. Accordingly, motion energy of the leg 3 is damped. Additionally, in this situation, some of the motion energy of the leg 3 is converted into and absorbed by elastic energy of the air according to spring property of the air as compressible fluid. Furthermore, the elastic energy is dispersed by the outflow resistance of the air from the bag-like member 19. Accordingly, while avoiding instantaneous rapid changes of the floor reaction force acting on the leg 3 through the bag-like member 19, an impact load in the landing motion of the leg 3 (hereinafter may be referred to as a landing shock) is reduced. In this situation, the bag-like member 19 is deformable and is deformed along a shape of the floor A to be compressed, so that the landing shock may be reduced without suffering from so much influence by the shape of the floor A and the posture of the foot mechanism 6 just before landing, and the bag-like member 19 is also less prone to damage and the like.

Additionally, when the leg 3 is lifted and the floor reaction force does not act on the bag-like member 19, the air in the atmosphere is flowed into the bag-like member 19 through the flow passage 20 by a restoring force into the natural state (inflated state) of the bag-like member 19, while the bag-like member 19 is inflating. In this situation, in the present embodiment, the restoring force of the bag-like member 19 is set in such a manner that the bag-like member 19 is restored into the natural state from a compressed state in a period that the leg 3 equipped with the bag-like member 19 becomes the free leg. Consequently, when the landing motion of the leg 3 is performed again, the bag-like member 19 is restored into the natural state. Accordingly, when the landing motion of the leg 3 is performed again, the landing shock may properly be reduced.

Figure 5:
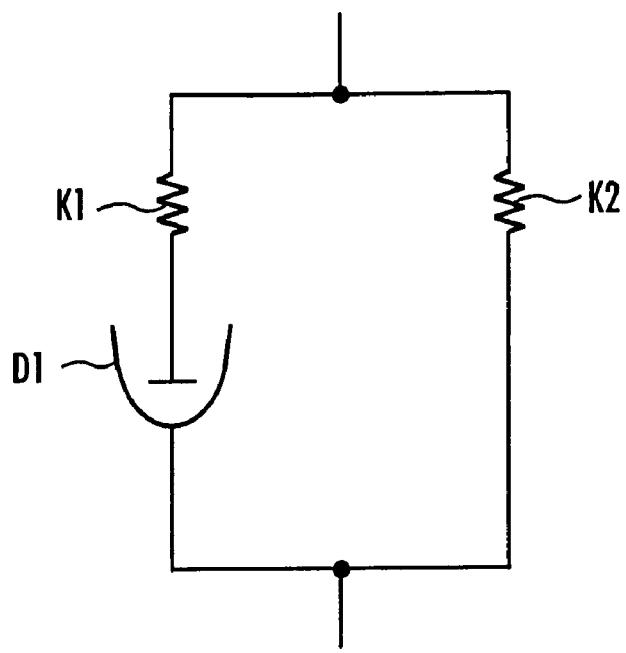
FIG. 5 is a schematic diagram describing an operation of the landing shock absorbing device of the foot mechanism of FIG. 2.

On a function associated with a reduction of the landing shock, the landing shock absorbing device 18 of the present embodiment for reducing the landing shock in this manner is analogous to a mechanism that what a spring K1 and a damper D1 are connected in series and a spring K2 are connected in parallel as shown in FIG. 5. The spring K1 is the compressing spring property of the air in the bag-like member 19 herein, so that its spring constant is proportional to a pressured area at the time that the bag-like member 19 is compressed and inversely proportional to a height of the bag-like member 19. In addition, the damper D1 is the outflow resistance when the air in the bag-like member 19 is flowed out through the flow passage 20 which is a throttled passage during the compression of the bag-like member 19, and consequently, its damping effect (an attenuating property of the motion energy) increases as an area of an aperture of the flow passage 20 decreases. Additionally, the spring K2 is the restoring force into the inflated state (natural state) of the bag-like member 19, and its spring constant depends on material properties, thickness, and the like of the bag-like member 19.

In this case, in order to smoothly absorb and dissipate the motion energy of the leg 3 in the landing motion of the leg 3 by the aforementioned operation of the landing shock absorbing device 18 of the present embodiment, basically, the spring constant of the spring K1 (a spring constant in the natural state of the bag-like member 19) is preferably adapted to sufficiently be larger than the spring constant of the spring K2. In other words, basically, the bag-like member 19 preferably has the area of its bottom portion arranged to be relatively larger, and the restoring force from the compressed state of the bag-like member 19 to the natural state (inflated state) of the same is preferably arranged to be relatively lower.

However, when the spring constant of the spring K1 is increased too much, a peak load (a peak load value of the floor reaction force) acting on the leg 3 through the bag-like member 19 tends to become large during the landing motion of the leg 3. On the contrary, when the spring constant of the spring K1 is decreased too much, the attenuating property of vibrations of the floor reaction force immediately after the landing of the leg 3 decreases. In addition, when the spring constant of the spring K2 is too small, the restoring force of the bag-like member 19 becomes weak. Particularly, when the moving speed of the robot 1 is relatively fast, after the lifting motion of the leg 3 until the leg 3 is landed next time, the bag-like member 19 may not sufficiently be restored into the natural state or a state close thereto.

Accordingly, in the landing shock absorbing device 18 of the present embodiment, a size of the bag-like member 19, the restoring force of the bag-like member 19 and the like are set in consideration of these points. Consequently, the landing shock absorbing device 18 can properly reduce the impact during the landing motion of the leg 3.

Additionally, the landing shock absorbing device 18 of the present embodiment may bring the following effects. In other words, fluid that flows into and out of the bag-like member 19 is the air of the compressible fluid, and hence the landing shock absorbing device 18 may be configured to be lightweight. Furthermore, during the landing motion of the leg 3, the pressure within the bag-like member 19 is increased with certain degree of a time constant and not increased instantaneously, so that the rapid change in the floor reaction force may be avoided. In addition, the air flowed out of the bag-like member 19 when the bag-like member 19 is compressed is released into the atmosphere and new air flows into the bag-like member 19 from the atmosphere when the bag-like member 19 is inflated, and resultingly, heat generated with outflow resistance of the air from the bag-like member 19 will not be stored in the bag-like member 19. In other words, the landing shock absorbing device 18 has a good heat dissipation property, so that a heat managing instrument such as an radiator does not need to be provided.

Additionally, the spring constant of the air in the bag-like member 19 functioning as a spring during the landing motion of the leg 3 becomes small with the compression immediately after the bag-like member 19 touches the ground, and hence an effect of control of the aforementioned composite-compliance operation may be enhanced. That is to say, in the control of the composite-compliance operation of the robot 1, as described above, the position and the posture of each foot mechanism 6 is corrected so as to allow the moment component about the axis of the horizontal direction for the actual total floor reaction force (hereinafter referred to as an actual total floor reaction force's moment) to follow the compensating total floor reaction force's moment (also including an occasion that the compensating total floor reaction force's moment is "0") as a desired value of the moment component. The composite-compliance operation control like this is for making the landing position and the posture of the foot mechanism 6 adjust to the floor A to secure the stability of the posture of the robot 1, even when the floor A has an inclination. In this situation, in order to enhance a following-property of the actual total floor reaction force moment to the compensating total floor reaction force's moment, it is preferable that a compliance gain in the composite-compliance operation control or a change amount of the desired landing position and the posture of the foot mechanism 6 to a change of the deviation between the actual total floor reaction force's moment and the compensating total floor reaction force's moment (a change amount of the rotational angle of the ankle joint 9) is increased. However, when the above compliance gain is taken to be big, in general, a loop gain of the composite compliance operation control (generally, this is proportional to the product of the above compliance gain and the total spring constant of the spring mechanism which the foot mechanism 6 has (the ground-contacting members 17, the elastic member 16, and the landing shock absorbing device 18)) becomes big, and resultantly, a control system tends to be unstable.

However, the spring constant of the air in the bag-like member 19 functioning as the spring K1 of the landing shock absorbing device 18 of the present embodiment becomes small with the compression immediately after the bag-like member 19 touches the ground, and hence the above loop gain becomes small. As a result, even when the compliance gain is increased, the stability of the composite compliance operation control may be secured. Consequently, the following-property of the actual total floor reaction force's moment to the compensating total floor reaction force's moment may be improved and furthermore, the securement of the stability of the posture of the robot 1 may be improved.

Figure 6:
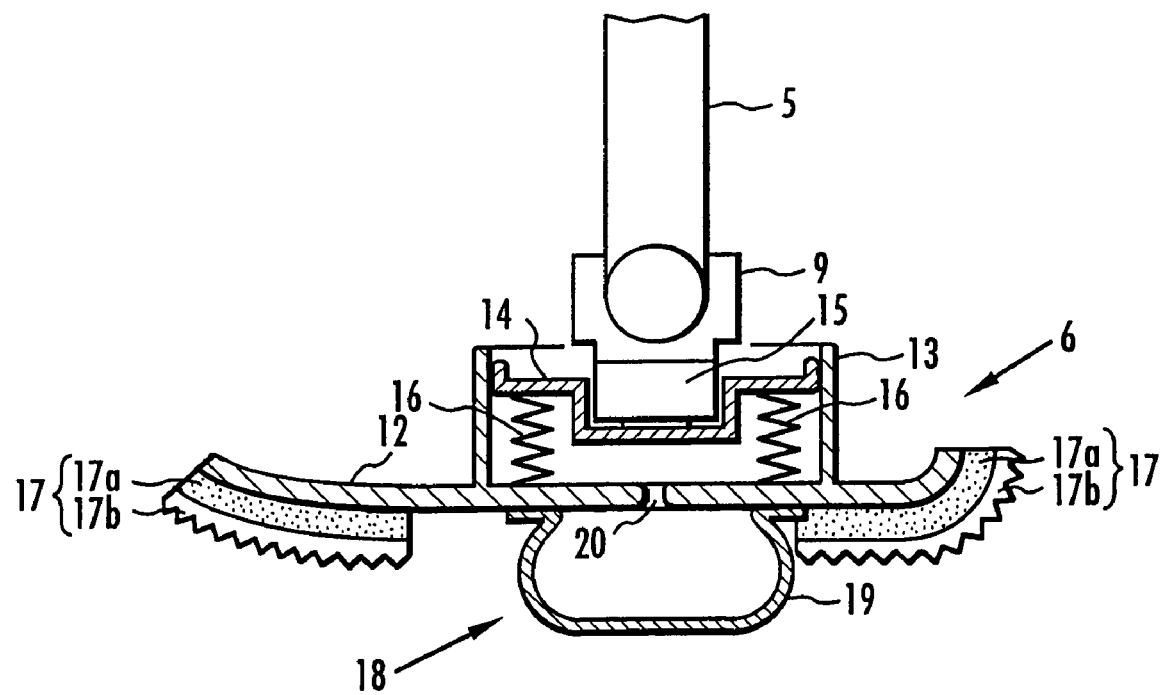
FIG. 6 is a cross sectional view showing a side face of a foot mechanism equipped with a landing shock absorbing device of a second embodiment of the present invention.

Subsequently, referring to FIG. 6, a second embodiment of the present invention is described. FIG. 6 is a cross sectional view showing a side face of the foot mechanism equipped with a landing shock absorbing device. Further, the present embodiment differs from the first embodiment only in a shape of a bag-like member, so that the reference numerals identical to those of the first embodiment are used. Descriptions about component portions identical to those of the first embodiment are omitted.

In the first embodiment, the bag-like member 19 formed in a cylindrical shape has been shown. However, the bag-like member 19 formed in a cylindrical shape tends to become deformed into a barrel shape in a state that the air in the bag-like member 19 is not so much pressured immediately after the bag-like member 19 makes contact with the ground during the landing motion of the foot mechanism 6. In the landing shock absorbing device 18 of the present embodiment, as shown in FIG. 6, a bag-like member 19 formed to be in the barrel shape in the natural state is attached on the bottom face of a foot plate member 12. Configurations other than this (including the control processing of the controller 10) are totally identical to those of the first embodiment.

In the landing shock absorbing device 18 of the present embodiment like this, the air in the bag-like member 19 is applied with pressure immediately after the bag-like member 19 makes contact with the ground, and hence a quick responding property of a shock absorbing operation for the landing shock caused by the landing shock absorbing device 18 is enhanced. Acting effects other than this are the same as those of the first embodiment.

Further, in the first and the second embodiments described above, the flow passage 20 of the air flowing into and flowing out of the bag-like member 19 is configured by a flow-passing hole drilled in the foot plate member 12, but a hose tube may also be used to constitute thereof.

Additionally, in the first and the second embodiments, the bag-like member 19 is constructed of the elastic material, thereby giving the shape restoring force to the bag-like member 19. However, for example, the bag-like member 19 may be constructed of a raw material without having the restoring force and the bag-like member 19 may also be energized into a predetermined inflated state by a different spring such as a coil spring.

Additionally, in the first and the second embodiments, the bag-like member 19 is shown in an upwardly opened type, but may also be a sealed type. In this situation, a flow-passing hole is drilled in the bag-like member, and an inflow and an outflow of the air with respect to the inside of the bag-like member may be executed through the flow-passing hole. Alternatively, a raw material having a plurality of fine holes such as a cloth, a net, a porous material, or the like may also constitute the bag-like member.

Subsequently, referring to FIG. 7(*a*) and FIG. 7(*b*), a third embodiment of the present invention is described. FIG. 7(*a*) and FIG. 7(*b*) are cross sectional views showing a configuration of infow/outflow means of a landing shock absorbing device of the present embodiment. Further, the present embodiment differs from the second embodiment only in the configuration of the inflow/outflow means, so that regarding component portions or function portions identical to those of the second embodiment, the reference numerals identical to those of the second embodiment are used, thereby omitting descriptions thereof.

As shown in FIG. 7, in the landing shock absorbing device in the present embodiment, inflow/outflow means 23 is equipped with a hollow valve chamber element 24 upwardly extended from the foot plate member 12 of each foot mechanism 6 and a discoidal valve element 25 provided in an interior of this valve chamber element 24. The interior of the valve chamber element 24 is communicated with the inside of the bag-like member 19 through a flow-passing hole 24*a* drilled in a lower end portion of the valve chamber element as well as with the atmospheric side through a flow-passing hole 24*b* drilled in an upper end portion of the valve chamber element 24.

The valve element 25 is provided with the flow-passing hole 25*a* drilled in the center portion thereof, and a notch portion 25*b* on one end portion (a left end portion in the figure. Additionally, the valve element 25 is adapted to be pivotable in a direction that the end portion with the notch portion 25*b* moves up and down, having a spindle 26 provided on the other end portion (a right end portion in the figure) as a supporting point. In this case, the valve element 25 is pivotable between a state that its top face portion abuts the upper end portion of the valve chamber element 24 as shown in FIG. 7(*a*) and a state that a lower end portion of the valve element 25 (an end portion having the notch portion 25*b*) abuts the lower end portion of the valve chamber element 24 as shown in FIG. 7(*b*), and in the state of FIG. 7(*a*), the notch portion 25*b* of the valve element 25 is closed and covered by the upper end portion of the valve chamber element 24 so as to allow the flow-passing hole 24*a* on the side of the bag-like member 19 and the flow-passing hole 24*b* on the atmospheric side to communicate with each other only through the flow-passing hole 25*a*. In the state of FIG. 7(b), both the flow-passing holes 24a and 24b are then adapted to be put in communication with each other through both of the flow-passing hole 25a and the notch portion 25b of the valve element 25. In addition, during the compression of the bag-like member 19 associated with the landing motion of the foot mechanism 6, the valve element 25 is pivoted into the state in FIG. 7(a) by rise in pressure in the bag-like member 19, and during the inflation of the bag-like member 19 associated with lifting of the foot mechanism 6, the valve element 25 is pivoted into the state in FIG. 7(b) by a negative pressure and a gravity generated in the bag-like member 19. Configurations except what has been described (including the control processing of the controller 10) are identical to those of the second embodiment.

In the landing shock absorbing device of the present embodiment equipped with the inflow/outflow means 23 in the configuration like this, the air flowing into the bag-like member 19 during the inflation of the bag-like member 19 passes through both of the flow-passing hole 25a and the notch portion 25b of the valve element 25 as shown in arrows in FIG. 7(b), so that its inflow resistance is relatively low. As a result, the bag-like member 19 may quickly be returned to the natural state (the inflated state).

In contrast, the air flowed out of the bag-like member 19 during the compression of the bag-like member 19 passes only through the flow-passing hole 25a of the valve element 25 as shown in an arrow in FIG. 7(a), so that its outflow resistance will be relatively great. As a result, a damping effect of the landing shock absorbing device according to its outflow resistance may be enhanced. Acting effects other than this are similar to those of the second embodiment.

Figure 8:
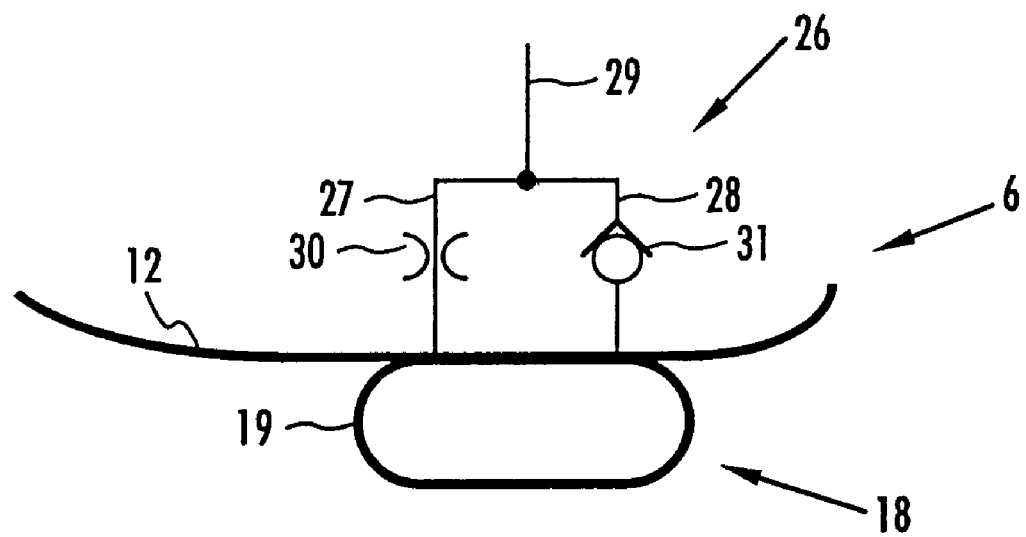
FIG. 8 is a schematic diagram of substantial portions of a foot mechanism equipped with a landing shock absorbing device of a fourth embodiment of the present invention.

Subsequently, referring to FIG. 8, a fourth embodiment of the present invention is described. FIG. 8 is a view in schematic form showing substantial portions of the foot mechanism equipped with a landing shock absorbing device of the present embodiment. Further, in the present embodiment, the foot mechanism is identical to that of the second embodiment except a configuration relating to the landing shock absorbing device, and only a configuration of the substantial portions of the foot mechanism is described in FIG. 8. Additionally, in a description of the present embodiment, regarding component portions or function portions identical to those of the second embodiment, the reference numerals identical to those of the second embodiment are used, thereby omitting descriptions thereof.

The present embodiment is configured by using inflow/outflow means such as a check valve or the like having a function equal to that of the inflow/outflow means 23 of the landing shock absorbing device of the third embodiment. Namely, referring to FIG. 8, in the present embodiment, inflow/outflow means 26 of the landing shock absorbing device 18 is equipped with a pair of fluid conduits 27, 28 communicated with the inside of the bag-like member 19 and lead out from the side of the bag-like member 19. These fluid conduits 27, 28 are opened to the atmospheric side through a joined conduit 29 joined to a far end portion thereof (an end portion on the opposite side of the bag-like member 19). A throttle portion 30 is provided in the fluid conduit 27 and a check valve 31 is provided in the fluid conduit 28. In this situation, the check valve 31 is provided to shut off the air from flowing out of the bag-like member 19 through the fluid conduit 28. Configurations other than such the inflow/outflow means 26 (including the control processing of the controller 10) are identical to those of the second embodiment.

In the landing shock absorbing device 18 equipped with the inflow/outflow means 26 like this, during the compression of the bag-like member 19, the air flows out into the atmosphere from the inside of the bag-like member 19 through the fluid conduit 27 having the throttle portion 30 and the joined conduit 29, and the air will not flow into the fluid conduit 28 by the check valve 31. Consequently, its outflow resistance will be relatively great. Additionally, when the bag-like member 19 is inflated, the air in the atmosphere flows from the joined conduit 29 through both the fluid conduits 27 and 28 into the bag-like member 19. Consequently, its inflow resistance will be relatively small. As a result, an acting effect equal to that of the third embodiment is achieved.

Further, in the present embodiment, the throttle portion 30 and the check valve 31 are constructed separately, but the inflow/outflow means 26 of the present embodiment may also be constructed using a one-way throttle valve in a usual structure.

Figure 9:
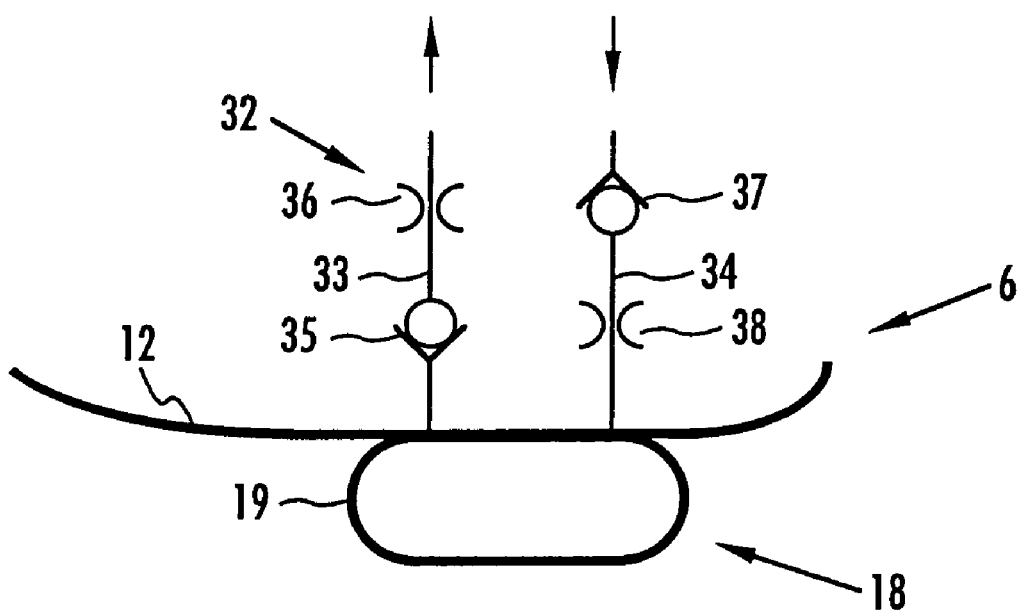
FIG. 9 is a schematic diagram of substantial portions of a foot mechanism equipped with a landing shock absorbing device of a fifth embodiment of the present invention.

Subsequently, referring to FIG. 9, a fifth embodiment of the present invention is described. FIG. 9 is a view in schematic form showing substantial portions of a foot mechanism equipped with a landing shock absorbing device of the present embodiment. Further, in the present embodiment, the foot mechanism is identical to that of the second embodiment excluding a configuration relating to the landing shock absorbing device, and only a configuration of the substantial portions of the foot mechanism is described in FIG. 9. Additionally, in a description of the present embodiment, regarding component portions or function portions identical to those of the second embodiment, the reference numerals identical to those of the second embodiment are used, thereby omitting descriptions thereof.

The aforementioned first to fourth embodiments are shown with a completely or a partially shared flow passage for executing inflow/outflow of the air to the bag-like member 19, respectively, but the present embodiment is designed to perform the inflow of the air into the bag-like member 19 and the outflow of the air from the bag-like member 19 in individual flow passages. In other words, inflow/outflow means 32 of the landing shock absorbing device 18 in the present embodiment is equipped with a pair of fluid conduits 33, 34 communicated with the inside of the bag-like member 19 and lead out from the side of the bag-like member 19, with far end portions of these fluid conduits 33, 34 (end portions on the opposite side to the bag-like member 19) being opened to the atmospheric side. The fluid conduit 33 is provided with a check valve 35 for blocking the inflow of the air into the bag-like member 19 and a throttle portion 36, and the fluid conduit 34 is provided with a check valve 37 for blocking the outflow of the air from the bag-like member 19 and a throttle portion 38. In this situation, an area of an aperture of the throttle portion 36 of the fluid conduit 33 is arranged to be smaller than an area of an aperture of the throttle portion 38 of the fluid conduit 34. Further, the area of the aperture of the throttle portion 38 of the fluid conduit 34 may be equal to the area of the aperture of the other portion of the fluid conduit 34. Configurations other than the configuration described above (including the control processing of the controller 10) are identical to those of the second embodiment.

In the landing shock absorbing device 18 equipped with the inflow/outflow means 32 like this, when the bag-like member 19 is compressed, the air in the bag-like member 19 is flowed out to the atmospheric side only through the fluid conduit 33, and the outflow resistance at this time is defined by the throttle portion 36. Additionally, when the bag-like member 19 is inflated, the air in the atmospheric side flows into the bag-like member 19 only through the fluid conduit 34, and the inflow resistance at this time is defined by the throttle portion 38. Consequently, the inflow and outflow resistances of the air to the bag-like member 19 are individually set in a desired characteristic. Additionally, in the present embodiment, the area of the aperture of the throttle portion 36 is smaller than the area of the aperture of the throttle portion 38, and hence the outflow resistance of the air to the bag-like member 19 is greater than the inflow resistance. Consequently, an acting effect equal to that of the third or fourth embodiment is achieved. Acting effects other than this are equal to those of the second embodiment.

Further, in respects of a simplification of the configuration of the inflow/outflow means and a reduction of component counts, the aforementioned first to fourth embodiments in which the inflow and outflow of the air into the bag-like member 19 is carried out by sharing a complete or a partial flow passage are advantageous.

Additionally, in the present embodiment, the check valve 35 of the fluid conduit 33 may be omitted, and in this case, when the bag-like member 19 is inflated, the air will flow into the bag-like member 19 through both the fluid conduits 33 and 34. However, air volume flowing into the bag-like member 19 through the fluid conduit 33 will be more than air volume flowing into the bag-like member 19 through the fluid conduit 34.

Figure 10:
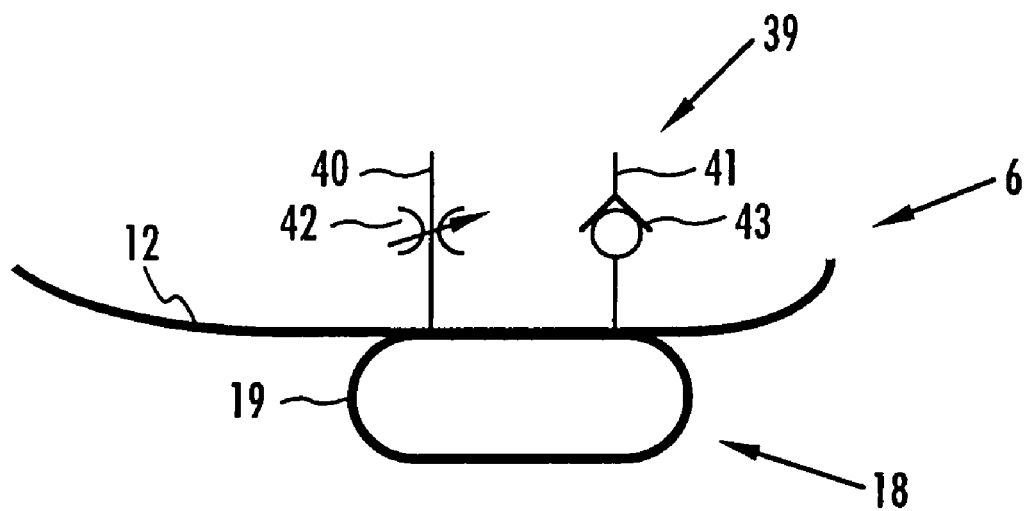
FIG. 10 is a schematic diagram of substantial portions of a foot mechanism equipped with a landing shock absorbing device of a sixth embodiment of the present invention.

Subsequently, referring to FIG. 10, a sixth embodiment of the present invention is described. FIG. 10 is a view in schematic form showing substantial portions of a foot mechanism equipped with a landing shock absorbing device of the present embodiment. Further, in the present embodiment, the foot mechanism is identical to that of the second embodiment excluding a configuration relating to the landing shock absorbing device, and only a configuration of the substantial portions of the foot mechanism is described in FIG. 10. Additionally, in a description of the present embodiment, regarding component portions or function portions identical to those of the second embodiment, the reference numerals identical to those of the second embodiment are used, thereby omitting descriptions thereof.

In the landing shock absorbing device 18 of the present embodiment, as inflow/outflow means 39, a pair of fluid conduits 40, 41 communicated with the inside of the bag-like member 19 and lead out from the side of the bag-like member 19 are provided, with far end portions of these fluid conduits 40, 41 (an end portion on the opposite side to the bag-like member 19) being opened to the atmospheric side. The fluid conduit 40 is provided with a variable throttle 42 (a solenoid proportional valve) which can electromagnetically control an area of an aperture by the controller 10, and the fluid conduit 41 is provided with a check valve 43 for blocking the air from flowing out of the bag-like member 19 through the fluid conduit 41. In this situation, in the present embodiment, as a moving speed of the robot 1 increases, the controller 10 controls the variable throttle 42 to reduce the area of the aperture of the variable throttle 42. Configurations other than this (including the control processing of the controller 10) are identical to those of the second embodiment.

In the landing shock absorbing device 18 of the present embodiment like this, during the compression of the bag-like member 19, the air in the bag-like member 19 flows out to the atmospheric side through the fluid conduit 40 having the variable throttle 42. Additionally, during the inflation of the bag-like member 19, the air in the atmosphere flows into the bag-like member 19 through both the fluid conduits 40, 41 (however, a large portion of the air flows into the bag-like member 19 through the fluid conduits 41). Consequently, regarding a magnitude relation between the outflow resistance and the inflow resistance of the air to the bag-like member 19, it is similar to that of the aforementioned third to fifth embodiments.

On the other hand, in the present embodiment, as the moving speed of the robot 1 increases, the area of the aperture of the variable throttle 42 is reduced to increase the outflow resistance of the air from the bag-like member 19, resulting in enhancing the damping effect. Accordingly, as the moving speed of the robot 1 increases, a floor reaction force acting on the leg 3 may quickly be put into a steady state during the landing motion of each leg 3. Regarding acting effects other than this, these are similar to those of the second embodiment.

Figure 11:
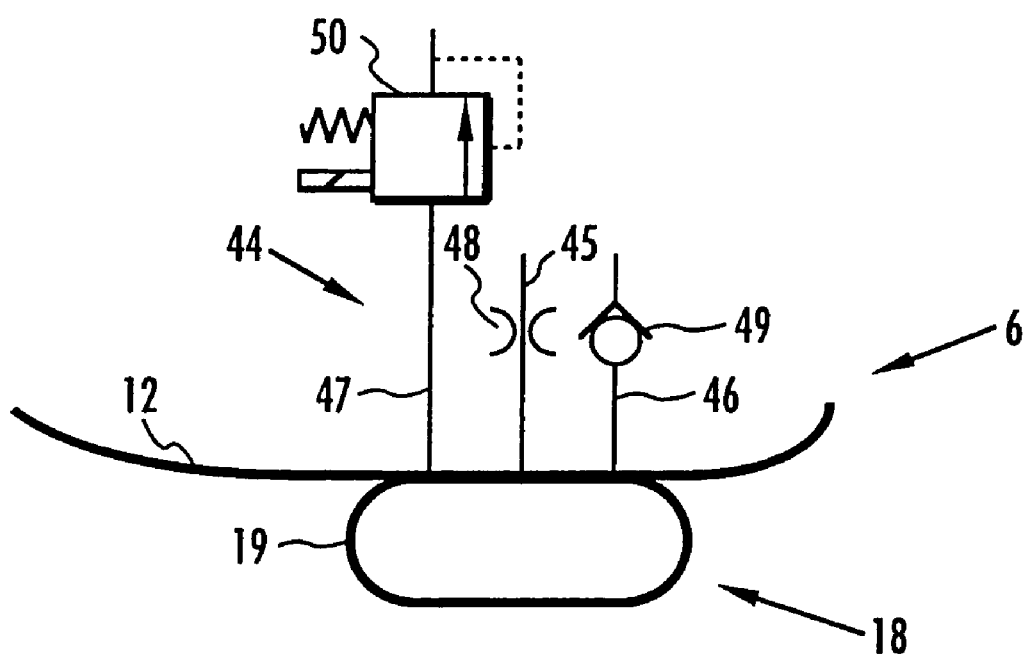
FIG. 11 is a schematic diagram of substantial portions of a foot mechanism equipped with a landing shock absorbing device of a seventh embodiment of the present invention.

Subsequently, referring to FIG. 11, a seventh embodiment of the present invention is described. FIG. 11 is a view in schematic form showing substantial portions of a foot mechanism equipped with a landing shock absorbing device of the present embodiment. Further, in the present embodiment, the foot mechanism is identical to that of the second embodiment excluding a configuration relating to the landing shock absorbing device, and only a configuration of the substantial portions of the foot mechanism is described in FIG. 11. Additionally, in a description of the present embodiment, regarding component portions or function portions identical to those of the second embodiment, the reference numerals identical to those of the second embodiment are used, thereby omitting descriptions.

In the landing shock absorbing device 18 of the present embodiment, as inflow/outflow means 44, three fluid conduits 45, 46, and 47 communicated with the inside of the bag-like member 19 and lead out from the side of the bag-like member 19 are provided, with far end portions of these fluid conduits 45 to 47 (an end portion on the opposite side to the bag-like member 19) being opened to the atmospheric side. The fluid conduit 45 is provided with a throttle portion 48, and the fluid conduit 46 is provided with a check valve 49 for blocking the air from flowing out of the bag-like member 19 through the fluid conduit 46. Furthermore, the fluid conduit 47 is provided with a relief valve 50 which can electromagnetically control a setting pressure by the controller 10. In this situation, in the present embodiment, as a moving speed of the robot 1 increases, the controller 10 controls the relief valve 50 to increase the setting pressure of the relief valve 50. Configurations other than this (including the control processing of the controller 10) are identical to those of the second embodiment.

In the landing shock absorbing device 18 of the present embodiment like this, during the compression of the bag-like member 19, the air in the bag-like member 19 flows out to the atmospheric side through the fluid conduit 45 having the throttle portion 48. Additionally, during the inflation of the bag-like member 19, the air in the atmosphere flows into the bag-like member 19 through both the fluid conduits 45, 46 (however, a large portion of the air flows into the bag-like member 19 through the fluid conduits 46). Consequently, regarding a magnitude relation between the outflow resistance and the inflow resistance of the air to the bag-like member 19, it is similar to that of the aforementioned third to sixth embodiments.

In contrast, in the present embodiment, during the compression of the bag-like member 19, when a pressure in the bag-like member 19 exceeds the setting pressure of the relief valve 50, the relief valve 50 is opened to block a further rise in the pressure in the bag-like member 19. This may prevent the pressure in the bag-like member 19 from rising excessively. In this case, generally, as the moving speed of the robot 1 increases, motion energy of the leg 3 increases, and hence in absorbing the motion energy, as the moving speed of the robot 1 increases, the pressure in the bag-like member 19 is preferably brought up to a higher pressure. Accordingly, in the present embodiment, as the moving speed of the robot 1 increases, the setting pressure of the relief valve 50 is adapted to be increased. Consequently, a reducing effect of the landing shock by the landing shock absorbing device 18 may properly be ensured without depending on the moving speed of the robot 1.

Figure 12:
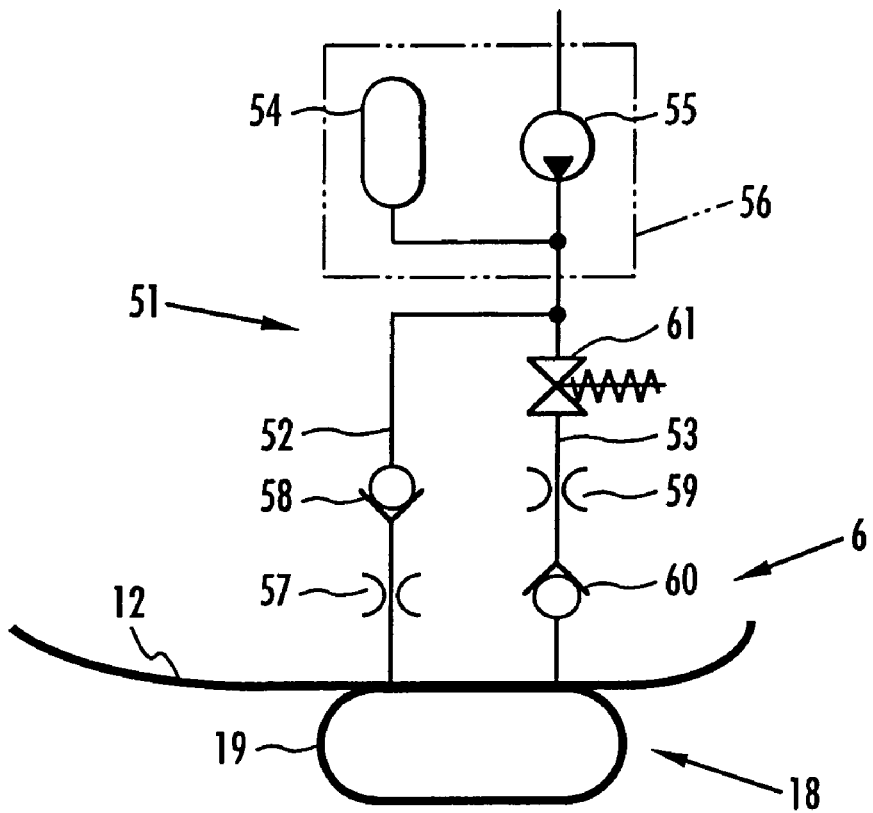
FIG. 12 is a schematic diagram of substantial portions of a foot mechanism equipped with a landing shock absorbing device of a eighth embodiment of the present invention.
Figure 13:
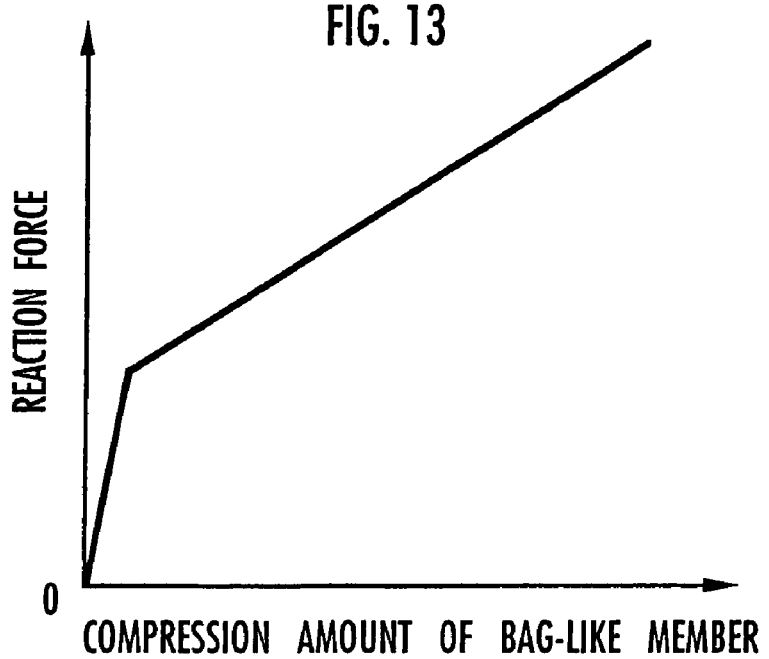
FIG. 13 is a diagram for describing an operation of the landing shock absorbing device of the eighth embodiment.

Subsequently, referring to FIG. 12 and FIG. 13, an eighth embodiment is described. FIG. 12 is a view in schematic form showing substantial portions of a foot mechanism equipped with a landing shock absorbing device of the present embodiment, and FIG. 13 is a diagram for describing an operation of the landing shock absorbing device of the present embodiment. Further, in the present embodiment, the foot mechanism is identical to that of the second embodiment excluding a configuration relating to the landing shock absorbing device, and only a configuration of the substantial portions of the foot mechanism is described in FIG. 12. Additionally, in a description of the present embodiment, regarding component portions or function portions identical to those of the second embodiment, the reference numerals identical to those of the second embodiment are used, thereby omitting descriptions thereof.

Referring to FIG. 12, in the landing shock absorbing device 18 of the present embodiment, as inflow/outflow means 51, a pair of fluid conduits 52, 53 communicated with the inside of the bag-like member 19 and lead out form the side of the bag-like member 19 are provided, and far end portions of these fluid conduits 52, 53 (an end portion on the opposite side to the bag-like member 19) are connected to an air pressure source 56 comprising an accumulator 54 and a pressure pump 55. The air pressure source 56 is a resource of the air in a predetermined pressure higher than the atmospheric pressure. In the fluid conduit 52, a throttle portion 57 and a check valve 58 for blocking the air from flowing into the bag-like member 19 through the fluid conduit 52 are provided, and in the fluid conduit 53, a throttle portion 59, a check valve 60 for blocking the air from flowing into the bag-like member 19 through the fluid conduit 53, and a solenoid valve 61 which can be controlled by the controller 10 are provided. In this case, an area of an aperture of the throttle portion 57 is designed to be smaller than the area of the aperture of the throttle portion 59.

Additionally, in the present embodiment, the bag-like member 19, in a inflated state as its natural state (in a state shown in FIG. 12), is adapted to be maintained in a shape in the natural state, so that almost no elastic force (shape restoring force) will be generated, even when its internal pressure becomes higher than the atmospheric pressure. That is to say, regarding a capacity of the bag-like member 19, its capacity in the natural state is adapted to substantially be the upper limit capacity. The bag-like member 19 in this fashion is constructed of, for example, an elastic material mixed with an unstretchable material such as a hard-to-stretch elastic material and ground fabric. Moreover, in the present embodiment, for example, in the lifting state of the leg 3, the controller 10 controls the solenoid valve 61 to open, and in the landing state of the leg 3, the controller 10 controls the solenoid valve 61 to close. Configurations other than the configuration described above (including the control processing of the controller 10) are identical to those of the second embodiment.

In the landing shock absorbing device 18 of the present embodiment like this, the solenoid valve 61 is opened in the lifting state of the leg 3. Accordingly, in the lifting state of the leg 3, the air pressured higher than the atmospheric pressure flows from the aforementioned air pressure source 56 through the fluid conduit 53 into the bag-like member 19, and hence the bag-like member 19 is inflated into the natural state (the state shown in FIG. 12). In this situation, an area of an aperture of the throttle portion 59 of the fluid conduit 53 is relatively wide, so that the inflow resistance of the air into the bag-like member 19 is relatively small, and the bag-like member 19 quickly inflates into the natural state (inflated state). Additionally, in this situation, regarding the bag-like member 19, the shape restoring force is not generated in the natural state in the present embodiment, and hence in the inflated state of the bag-like member 19, the air in the bag-like member 29 will have a preload according to a difference between the pressure in the bag-like member 19 and the atmospheric pressure.

Additionally, during the landing motion of the leg 3, after the bag-like member 19 touches the ground associated with the landing motion, the bag-like member 19 is compressed and pressurized with its internal air, so that the air flows out of the bag-like member 19 through the fluid conduit 52. At this time, the outflow resistance of the air is generated by the throttle portion 57 of the fluid conduit 52. According to this, basically, the landing shock may be reduced as in the above-mentioned first to seventh embodiments. In this situation, an area of an aperture of the throttle portion 57 of the fluid conduit 52 is relatively small and the pressure of the air flowed out of the bag-like member 19 is high, and consequently, the outflow resistance of the air during the compression of the bag-like member 19 increases, so that the damping effect of the landing shock absorbing device 18 of the present embodiment may be enhanced.

Furthermore, in the present embodiment, particularly, in the inflated state of the bag-like member 19, preload is given to the air in the interior thereof. Consequently, as shown in FIG. 13, reaction force generated with the compression of the bag-like member 19 rapidly increases immediately after the bag-like member 19 starts to be compressed, and after that, the reaction force will linearly increase with an increase in a compression amount of the bag-like member 19 (a compression amount of the bag-like member 19 in a vertical direction). Consequently, immediately after the bag-like member 19 touches the ground with the landing motion of the leg 3, momentum of the foot mechanism 6 of the leg 3 may rapidly be decreased (an impulse in a direction that the momentum of the foot mechanism 6 is decreased immediately after the bag-like member 19 touches the ground may be increased), and then a peak value for an impact load (floor reaction force) acting on the leg 3 during the landing motion of the leg 3 may be decreased. In other words, a reducing effect of the landing shock may be enhanced.

Furthermore, in the present embodiment, in the landing state of the leg 3, the solenoid valve 61 is closed, and consequently, the air can not flow into the bag-like member 19, so that the bag-like member 19 is maintained in the compressed state. Therefore, the floor reaction force may be acted intensively on a desired area of the foot mechanism 6 by a posture control in the landing state of the foot mechanism 6 without the floor reaction force acting on a spot of the bag-like member 19. For example, when robot 1 is about to forwardly topple over, the floor reaction force can be concentrated on the front end side of the foot mechanism 6. As a result, the posture of the robot 1 may easily be stabilized. Further, in an additional description about this, if the solenoid valve 61 is kept opened in the landing state of the leg 3, high-pressure air always attempts to flow into the bag-like member 19 from the air pressure source 56 (the bag-like member 19 attempts to inflate), and hence the floor reaction force will always act on the spot of the bag-like member 19. Accordingly, the floor reaction force can not be concentrated on the desired area of the foot mechanism 6, so that stabilization of the posture of the robot 1 by a posture control in the landing state of the foot mechanism 6 tends to be limited. With respect to this, in the landing shock absorbing device 18 of the present embodiment, the limitation on stabilization of the posture of the robot 1 may be improved, as described above.

Further, in the above eighth embodiment, the bag-like member 19 is constructed of the elastic material, but may also be constructed of a flexible material that does not have elasticity. In the eighth embodiment, also in this manner, the high-pressure air is flowed into the bag-like member 19, so that the bag-like member 19 may be inflated. Additionally, regarding an open/close control of the solenoid valve 61, in a period immediately after the leg 3 is moved from the landing state into the lifting state, the bag-like member 19 may also be maintained in the compressed state in a manner that the solenoid valve 61 is held closed. This allows the lifting motion of the leg 3 to be carried out smoothly.

Figure 14:
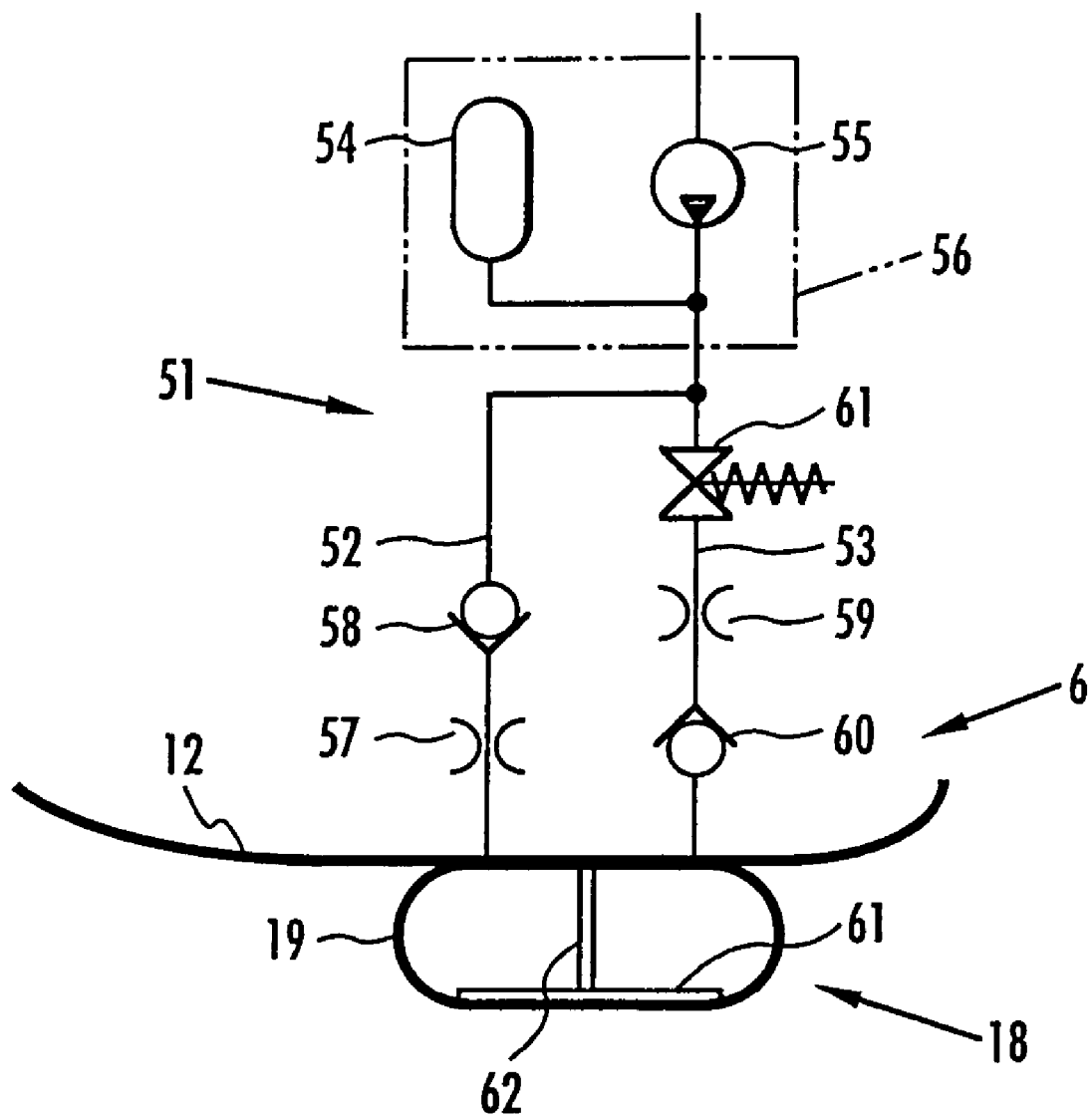
FIG. 14 is a schematic diagram of substantial portions of a foot mechanism equipped with a landing shock absorbing device of a ninth embodiment of the present invention.
Figure 15:
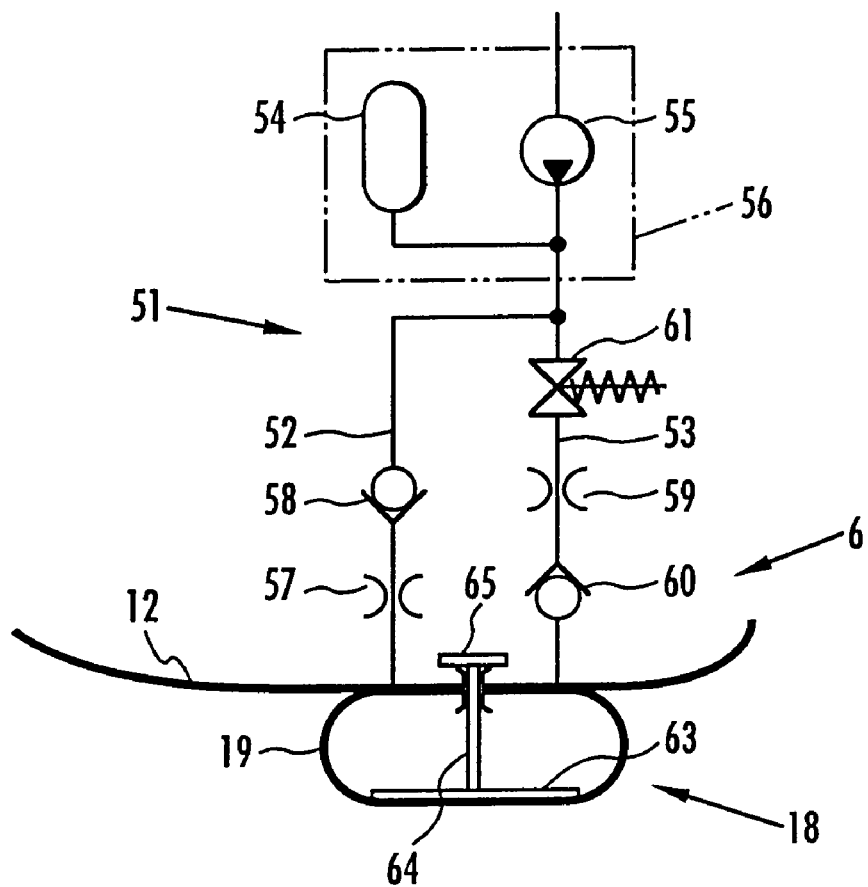
FIG. 15 is a schematic diagram of substantial portions of a foot mechanism equipped with a landing shock absorbing device of a tenth embodiment of the present invention.

Additionally, in the aforementioned eighth embodiment, the use of a hard-to-stretch material or the like allows the air in the bag-like member 19 to have preload in such a way to prevent the bag-like member 19 from inflating more than the natural state. However, the air in the bag-like member 19 may also have preload by structurally preventing the bag-like member 19 from inflating more than the natural state, even when its internal pressure is arranged to be higher than the atmosphere. Such examples of preload giving mechanisms as a ninth embodiment and a tenth embodiment are shown in FIG. 14 and FIG. 15, respectively. Further, in FIG. 14 and FIG. 15, the same reference numerals are given to component portions identical to those of the eighth embodiment.

In the ninth embodiment shown in FIG. 14, a plate member 61 is fixed on a bottom face portion in a bag-like member 19, and this plate member 61 is connected through a flexible wire 62 to a foot plate member 12 in the interior portion of the bag-like member 19. The other configurations are identical to those of the eighth embodiment. In this ninth embodiment, a state that the wire 62 is stretched is an inflated state of the bag-like member 19, so that the bag-like member 19 will not be inflated more than this state. Consequently, in the inflated state of the bag-like member 19, the air of its interior portion may be given with preload as in the eighth embodiment. Further, the stretched wire 62 allows a compression of the bag-like member 19 to be executed without any problem.

In the tenth embodiment shown in FIG. 15, a plate member 63 is fixed on a bottom face portion in a bag-like member 19, and a rod member 64 upwardly extended from this plate member 63 slidably passes through a foot plate member 12 in a vertical direction (a compressed direction of the bag-like member 19) to protrude to the upper side. A stopper plate 65 is fixed on the upper end portion of the rod member 64, and this stopper plate 65 abuts against a top face portion of the foot plate member 12 so as to control a downward movement of the rod member 64. The other configurations are identical to those of the eighth embodiment. In this tenth embodiment, a state that the stopper plate 65 is abutted against the top face portion of the foot plate member 12 is an inflated state of the bag-like member 19, so that the bag-like member 19 will not be inflated more than this state. Consequently, in the inflated state of the bag-like member 19, the air of its interior portion may be given with preload as in the eighth embodiment. Further, the rod member 64 moves upward with the stopper plate 65 upwardly leaving from the foot plate member 12, so that the compression of the bag-like member 19 is executed without any trouble.

Figure 16:
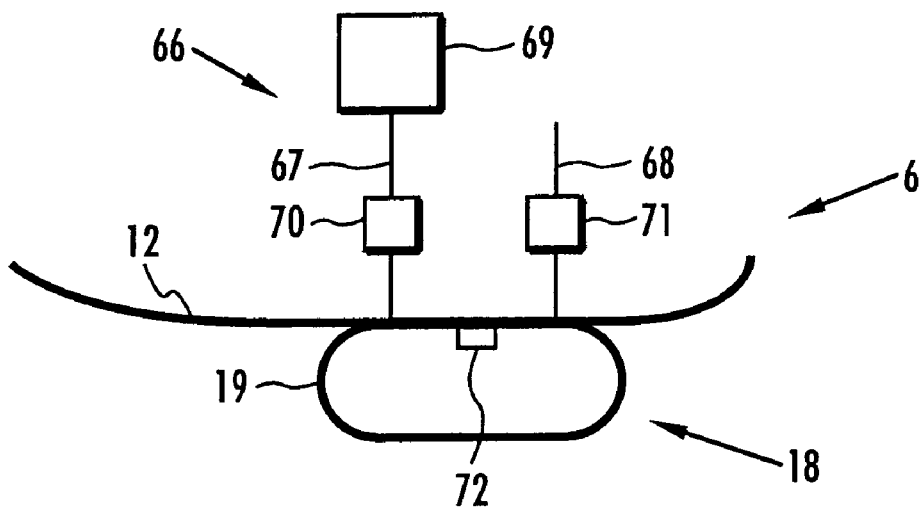
FIG. 16 is a schematic diagram of substantial portions of a foot mechanism equipped with a landing shock absorbing device of a eleventh embodiment of the present invention.
Figure 17:
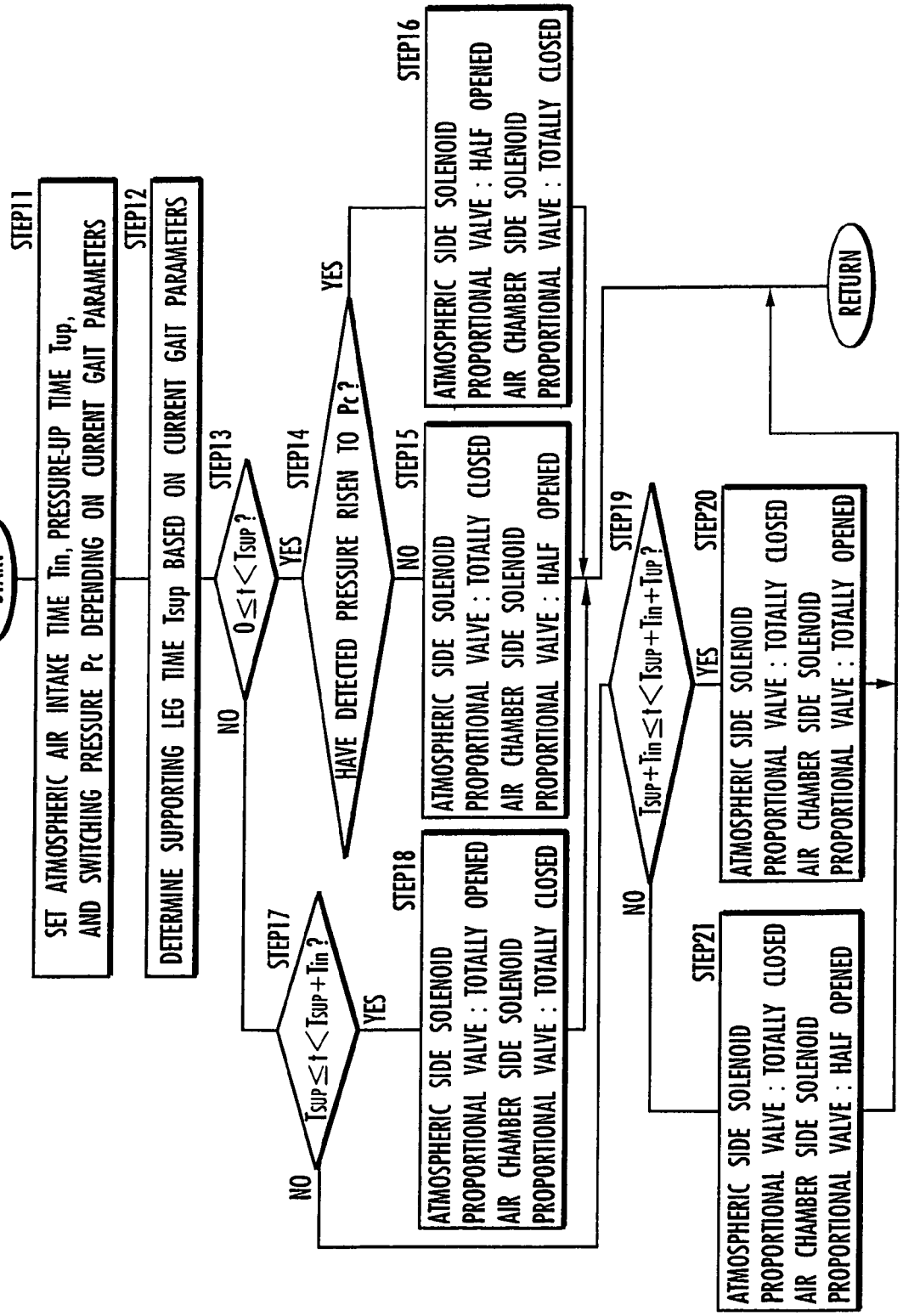
FIG. 17 is a flowchart showing control processing of inflow/outflow means of a landing shock absorbing device of the eleventh the present invention.

Subsequently, referring to FIG. 16 and FIG. 17, an eleventh embodiment is described. FIG. 16 is a view in schematic form showing substantial portions of a foot mechanism equipped with a landing shock absorbing device of the present embodiment, and FIG. 17 is a flowchart showing control processing associated with the present embodiment. Still more, in the present embodiment, the foot mechanism is identical to that of the second embodiment except a configuration with respect to the landing shock absorbing device, and in FIG. 16, only the configuration of the substantial portions of the foot mechanism is described. Additionally, in a description of the present embodiment, regarding component portions or function portions identical to the second embodiment, reference numerals identical to those of the second embodiment are used, thereby omitting descriptions thereof.

As shown in FIG. 16, in a landing shock absorbing device 18 of the present embodiment, a pair of fluid conduits 67, 68 communicated with the inside of a bag-like member 19 and lead out from a side of the bag-like member 19 are provided as inflow/outflow means 66, and a far end portion of the fluid conduit 67 (an end portion on the opposite side to the bag-like member 19) is connected to an air chamber 69 filled with the air. In addition, a far end portion of the fluid conduit 68 (an end portion on the opposite side to the bag-like member 19) is opened to the atmospheric side. These fluid conduits 67, 68 are provided with solenoid proportional valves 70, 71 with its opened/closed state being controlled by the controller 10, respectively. Moreover, in the interior portion of the bag-like member 19, a pressure sensor 72 for detecting pressure of its interior portion is provided, and its output is adapted to be input into the controller 10. Still more, pressure of the air in the air chamber 69 is higher than the atmospheric pressure. Additionally, the bag-like member 19 is constructed of a hard-to-stretch elastic material as in the eighth embodiment in such a way to hardly be inflated more than the natural state, when the pressure of its interior portion is higher than the atmospheric pressure. Additionally, in the following description, the solenoid proportional valve 70 is referred to as an air chamber side solenoid proportional valve 70, and the solenoid proportional valve 71 is referred to as an atmospheric side solenoid proportional valve 71.

In this situation, in the present embodiment, the controller 10 executes processing shown in the flowchart of FIG. 17 for each leg 3 in parallel with the motion control of the robot 1, and for each control cycle in parallel with the processing of STEP 5 in the flowchart of the aforementioned FIG. 4, resulting in controlling an opened/closed state of the solenoid proportional valves 70, 71.

That is to say, depending on gait parameters currently set (movement modes, length of step, moving speed, etc. of the robot 1), the controller 10 sets atmospheric air intake time Tin defining a period to make the air in the atmosphere flow into the bag-like member 19 in a lifting state of the leg 3, pressure-up time Tup defining a period that the air in the air chamber 69 is flowed into the bag-like member 19 in the lifting state of the leg 3 to increase the pressure in the bag-like member 19, and switching pressure Pc defining timing that the air in the bag-like member 19 is flowed out to the atmospheric side after the bag-like member 19 touches the ground during the landing motion of the leg 3 (STEP 11). Further, basically, the atmospheric air intake time Tin is set at a shorter time as the moving speed of the robot 1 increases, basically, the pressure-up time Tup is set at a longer time as the moving speed of the robot 1 increases, and basically, the switching pressure Pc is set at higher pressure as the moving speed of the robot 1 increases.

Furthermore, based on the gait parameters currently set, the controller 10 determines a time Tsup that the leg 3 is in a supporting leg stage (time that the foot mechanism 6 is maintained in a state that the foot mechanism 6 is put in contact with the ground through the ground-contacting members 17 or the bag-like member 19, and hereinafter referred to as a supporting leg time Tsup) (STEP 12).

Subsequently, the controller 10 judges whether or not current time t is $0 \leq t < Tsup$, and in other words, judges whether or not the current time t is timing in the supporting leg stage (STEP 13). At this moment, when the current time t is in the supporting leg stage, the controller 10 further judges whether or not the detected pressure by the pressure sensor 72 has risen up to the switching pressure Pc (STEP 14), and when the detected pressure has not risen up to the switching pressure Pc, the atmospheric side solenoid proportional valve 71 is held in a totally closed state and the air chamber side solenoid proportional valve 70 is held in a half opened state (STEP 15). Additionally, in STEP 14, when the detected pressure has risen up to the switching pressure Pc, the atmospheric side solenoid proportional valve 71 is held in a half opened state, and the air chamber side solenoid proportional valve 70 is held in the totally closed state (STEP 16). Further, in this case, after executing the processing of the STEP 16, as long as the current time t is in the supporting leg stage, even when the detected pressure drops lower than the switching pressure Pc, the controller 10 holds the atmospheric side solenoid proportional valve 71 in the half opened state and the air chamber side solenoid proportional valve 70 in the totally closed state.

In the aforementioned STEP 13, when it is not $0 \leq t < Tsup$, the controller 10 further judges whether or not the current time t is $Tsup \leq t < Tsup+Tin$, in other words, whether or not it is in a period until the atmospheric air intake time Tin has elapsed after the supporting leg stage of the leg 3 is ended (hereinafter, this period is referred to as an atmospheric air intake period) (STEP 17). At this time, when the current time t is in the atmospheric air intake period, the controller 10 holds the atmospheric side solenoid proportional valve 71 in a totally opened state and the air chamber side solenoid proportional valve 70 in the totally closed state (STEP 18).

Furthermore, in STEP 17, when it is not $Tsup \leq t < Tsup+Tin$, the controller 10 judges whether or not the current time t is $Tsup+Tin \leq t < Tsup+Tin+Tup$, in other words, whether or not it is within a period after the atmospheric air intake period has elapsed until the pressure-up time Tup elapses (hereinafter, this period is referred to as a pressure-up period) (STEP 19). At this time, when the current time t is within the pressure-up period, the controller 10 holds the atmospheric side solenoid proportional valve 71 in the totally closed state, and the air chamber side solenoid proportional valve 70 in the totally opened state (STEP 20).

Additionally, in STEP 19, when the current time t is not in the pressure-up period (it is not in the supporting leg stage or the atmospheric air intake period), as in the aforementioned STEP 15, the controller 10 holds the atmospheric side solenoid proportional valve 71 in the totally closed state and the air chamber side solenoid proportional valve 70 in the half opened state (STEP 21).

In the landing shock absorbing device 18 of the present embodiment controlling the opened/closed state of the solenoid proportional valves 70, 71 in this fashion, from shortly before the bag-like member 19 of the leg 3 touches the ground, the atmospheric side solenoid proportional valve 71 is held in the totally closed state and the air chamber side solenoid proportional valve 70 is held in the half opened state. Accordingly, in moments after the bag-like member 19 touches the ground with the landing motion of the leg 3, while the bag-like member 19 and the air of its interior portion are compressed and pressurized, the air in the bag-like member 19 flows out to the air chamber 69 through a throttle formed by the air chamber side solenoid proportional valve 70 in the half opened state. Consequently, the air in the bag-like member 19 flows out with the outflow resistance and the damping effect is generated. Further, at this time, the pressure in the air chamber 69 rises to become high pressure.

Moreover, when the compression of the bag-like member 19 proceeds and the pressure of its interior portion exceeds the switching pressure Pc, the atmospheric side solenoid proportional valve 71 is held in the half opened state and the air chamber side solenoid proportional valve 70 is held in the totally closed state. Accordingly, the air in the bag-like member 19 flows out to the atmospheric side through the throttle formed by the atmospheric side solenoid proportional valve 71 in the half opened state. Consequently, in the same way as immediately after the bag-like member 19 makes contact with the ground, the air in the bag-like member 19 flows out with the outflow resistance, and hence the damping effect is generated. Such a compression of the bag-like member 19 and an outflow motion of the air of its interior portion during the landing motion of the leg 3 allows the landing shock to be reduced as in the second embodiment or the like.

On the contrary, after the elapse of the supporting leg stage of the leg 3, in the atmospheric air intake period immediately after the supporting leg stage of the leg 3 has ended, the atmospheric side solenoid proportional valve 71 is held in the totally opened state and the air chamber side solenoid proportional valve 70 is held in the totally closed state. Accordingly, while the bag-like member 19 is inflated by the restoring force of the bag-like member 19 into the inflated state, the air in the atmosphere flows into the bag-like member 19. When the bag-like member 19 is inflated to some extent after the atmospheric air intake period has passed, subsequently, the atmospheric side solenoid proportional valve 71 is held in the totally closed state and the air chamber side solenoid proportional valve 70 is held in the totally opened state in the pressure-up period. Accordingly, the high-pressure air in the air chamber 69 flows into the bag-like member 19, so that the pressure in the bag-like member 19 will be higher than that of the atmosphere. As a result, the air in the bag-like member 19 is given with preload like that of the eighth embodiment. Further, after the pressure-up period ends (shortly before the leg 3 on the free leg side is landed again), the atmospheric side solenoid proportional valve 71 is held in the totally closed state and the air chamber side solenoid proportional valve 70 is held in the half opened state so as to be prepared for a next landing motion. In this state, the pressure in the air chamber 69 and the pressure in the bag-like member 19 are basically equal.

As described above, in the present embodiment, the air in the bag-like member 19 is given with preload before the landing of the leg 3 as in the eighth embodiment, so that an acting effect similar to that of the eighth embodiment is achieved. In this situation, particularly in the present embodiment, the air pressure source is not needed, and resultingly, the configuration of the landing shock absorbing device 18 is simplified and energy consumption of the robot including the landing shock absorbing device 18 may be decreased. In addition, when the air chamber side solenoid proportional valve 70 is in the half opened state, heat generated from the air flowing with the outflow resistance between the air chamber 69 and the bag-like member 19 is released to the atmospheric side when the atmospheric side solenoid proportional valve 71 is arranged in the half opened state or the totally opened state, and resultingly, the heat will not continuously be stored up in the landing shook absorbing device 18 of the present embodiment. As a result, a radiator does not need to be provided separately, and this also allows the configuration of the landing shock absorbing device 18 to be simplified.

Further, in the landing shock absorbing device 18, to give the preload to the bag-like member 19 in the inflated state, the preload giving mechanism as described in the ninth embodiment or the tenth embodiment may also be employed.

Additionally, in the eleventh embodiment, the fluid conduit 68 and the atmospheric side solenoid proportional valve 71 to provide communications between have the interior of the bag-like member 19 and the atmospheric side, but these may be eliminated and the air may be given and received only between the air chamber 69 and the bag-like member 19. In this case, for example, the air chamber side solenoid proportional valve 70 is maintained in the half opened state. Consequently, in the inflated state of the bag-like member 19, the pressure in the bag-like member 19 becomes high pressure as in the eighth embodiment and the ninth embodiment, resulting in giving the preload to the air of the interior portion thereof. Therefore, regarding the reducing of the landing shock, effects similar to those of the eighth embodiment and the ninth embodiment may be obtained. However, the air is sealed in the air chamber 69 and the interior portion of the bag-like member 19, so that heat with the outflow resistance when the air flows between both the components tends to be stored up. Consequently, it is desirable that a radiator or the like is separately provided.

Figure 18:
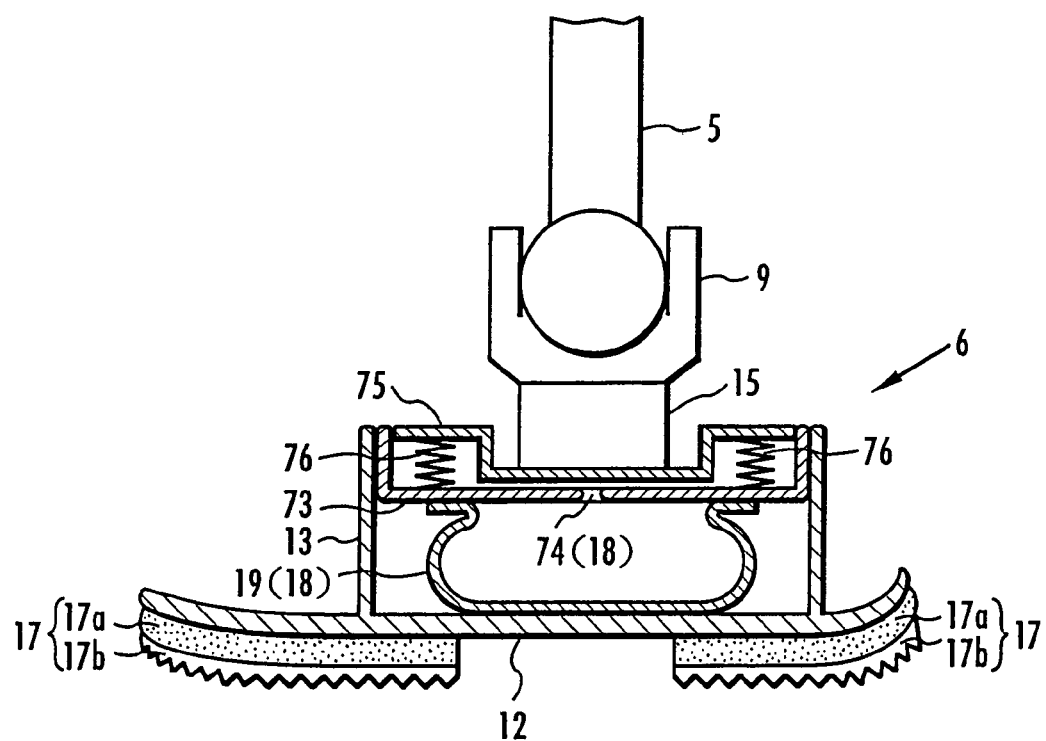
FIG. 18 is a cross sectional view showing a side face of a foot mechanism equipped with a landing shock absorbing device of a twelfth embodiment of the present invention.

Subsequently, referring to FIG. 18, a twelfth embodiment is described. FIG. 18 is a cross sectional view showing the side face of a foot mechanism equipped with a landing shock absorbing device of the present invention. Further, the present embodiment differs from those of the first and second embodiments only in a partial configuration of the foot mechanism and a partial configuration of the landing shock absorbing device. Consequently, regarding component portions or function portions identical to those of the first and the second embodiments, the reference numerals identical to those of the first and the second embodiments are used, thereby omitting descriptions thereof.

In the present embodiment, a tube member 13 in a sectional square shape is fixed on a top face portion of the foot mechanism 6 like those of the first and the second embodiments, and an upwardly opened barrel shape bag-like member 19 (variable capacity element) is accommodated in the tube member 13 like the bag-like member of the second embodiment. In this situation, a bottom face of the bag-like member 19 is secured to a foot plate member 12 in the tube member 13. In addition, in the tube member 13, a movable tube member 73 having a bottom is accommodated in the upper side of the bag-like member 19, and this movable tube member 73 is provided in a vertically movable fashion along an inner circumferential surface of the tube member 13. An opened end portion of the bag-like member 19 is fixed on the bottom portion of the movable tube member 73. Therefore, the movable tube member 73 is connected to the foot plate member 12 through the bag-like member 19. Furthermore, a flow passage (a flow-passing hole) 74 as the inflow/outflow means in the present embodiment is drilled to be communicated with the interior portion of the bag-like member 19 on the bottom portion of the movable tube member 73. This flow passage 74 is arranged to be a throttled passage and constitutes the landing shock absorbing device 18 of the present embodiment together with the bag-like member 19.

Additionally, a movable plate 75, which can move in a substantially vertical direction along the inner circumferential surface of the movable tube member 73, is accommodated in the interior portion of the movable tube member 73, and the lower peripheral portion of the movable plate 75 is connected to the top face portion of the movable tube member 73 through a plurality of elastic members 76 constructed of a elastic material such as spring, rubber or the like (described as springs in FIG. 18). An ankle joint 9 of the leg 3 is connected to the top face portion of this movable plate 75 through the six-axis force sensor 15.

Further, a space in the interior portion of the movable tube member 73 (a space between the movable plate 75) is opened to the atmospheric side through a hole or a gap not shown. Consequently, the interior portion of the bag-like member 19 is communicated with the atmospheric side through the flow passage 74, and in a state that the bag-like member 18 is inflated as shown, the interior portion of the bag-like member 18 is filled with the air under the atmospheric pressure. Additionally, in the present embodiment, the bag-like member 19 is constructed of an elastic material having difficulty to stretch more than the inflated state (natural state) shown in the figure to prevent the movable tube member 73 from falling off from the tube member 13 due to the bag-like member 19 stretched by weight of the foot plate member 12, etc. in the landing state of the leg 3. Alternatively, the movable tube member 73 is structurally designed to prevent from falling off from the tube member 13. Configurations except those just described (including the control processing of the controller 10) are identical to those of the first and the second embodiments.

In the landing shock absorbing device 18 of the present embodiment configured as described above, at the time of the landing motion of the leg 3, when the foot mechanism 6 of the leg 3 makes contact with the ground through ground-contacting members 17, the air in the bag-like member 19 flows out through the flow passage 74 while the bag-like member 19 is compressed. At this time, the flow passage 74 is a throttled passage, resulting in generating the outflow resistance. The operation of the landing shock absorbing device 18 of the present embodiment like this allows the landing shock at the time of the landing motion of the leg 3 to be reduced like those of the first and the second embodiments. Additionally, in the lifting state of the leg 3, the bag-like member 19 is restored into an original inflated state by its elastic force, and at this time, the air in the atmosphere flows into the bag-like member 19 through the flow passage 74.

Further, in the present embodiment, the bag-like member 19 is provided as a variable capacity element. However, for example, it is possible that the tube member 13 is formed in a cylindrical shape (a cylinder tube shape) and the movable tube member 73 is formed in a piston shape to be configured as the variable capacity element in a space under the movable tube member 73 in the tube member 13.

Figure 19:
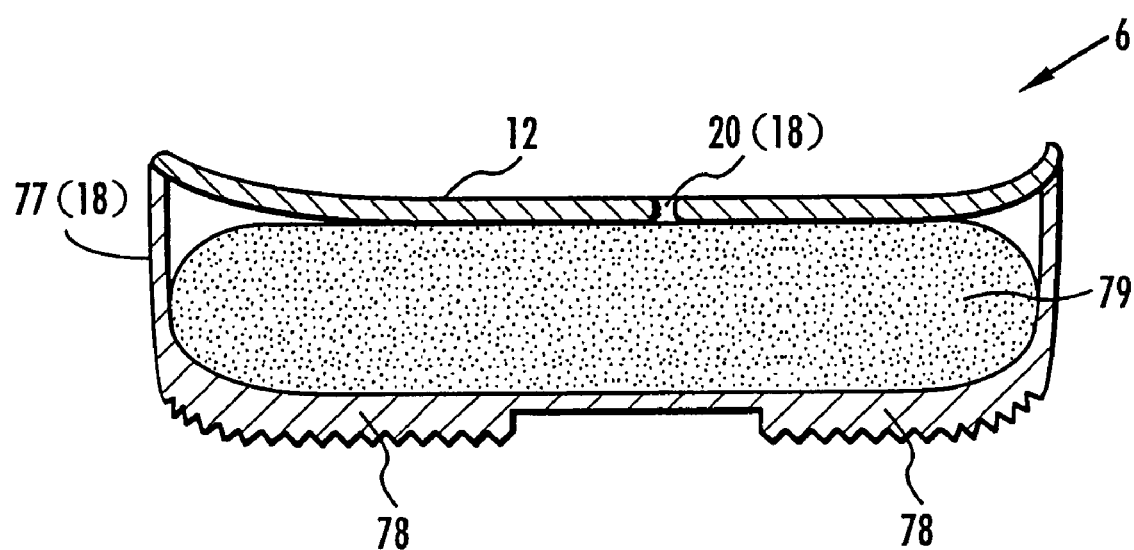
FIG. 19 is a cross sectional view showing a side face of substantial portions of a foot mechanism equipped with a landing shock absorbing device of a thirteenth embodiment of the present invention.

Subsequently, referring to FIG. 19, a thirteenth embodiment of the present embodiment is described. FIG. 19 is a cross sectional view showing a side face of the substantial portions of a foot mechanism equipped with a landing shock absorbing device of the present embodiment. Further, the present embodiment differs from the first and the second embodiments only in a partial configuration of the foot mechanism including the landing shock absorbing device, and hence only a configuration of the substantial portions of the foot mechanism is described in FIG. 19. Additionally, in the description of the present embodiment, regarding component portions or function portions identical to those of the first and the second embodiments, reference numerals identical to those of the fist and the second embodiments are used, thereby omitting descriptions thereof.

As shown in FIG. 19, in the landing shock absorbing device 18 of the present embodiment, a bag-like member 77 as a variable capacity element is attached on a bottom face of a foot plate member 12 of the foot mechanism 6 in such a manner to substantially cover the entire structure of it. This bag-like member 77 is formed of an elastic material such as rubber or the like into an upwardly opened closed-bottomed container shape, like those of the first and the second embodiments, and the entire periphery of its opened end portion thereof is fixed to a periphery of a lower face portion of the foot plate member 12. In four corners of the bottom face portion of the bag-like member 77 (both the side portions located toward a front portion of the bag-like member 77, and, both the side portions located toward a rear portion thereof), ground-contacting portions 78 corresponding to hard layers 17b of ground-contacting members 17 in the first and the second embodiments are provided uniformly with the bag-like member 77. Further, the ground-contacting portions 78 may also be separated elements from the bag-like member 77.

Additionally, in an interior portion of the bag-like member 77, a sponge 79 (more generally speaking, a soft elastic porous element) is accommodated in substantially throughout the entire interior portion of the bag-like member 77. Moreover, the interior portion of the bag-like member 77 is communicated with the atmospheric side through a flow passage 20 drilled in the foot plate member 12 as inflow/outflow means like those of the first and the second embodiments. Further, in the present embodiment, the ground-contacting members 17 provided in the first and the second embodiments are not equipped in the foot ground-contacting plate 12. Configurations except what has been described (including the control processing of the controller 10) are identical to those of the first and the second embodiments.

In the landing shock absorbing device 18 of the present embodiment like this, at the time of the landing motion of the leg 3, the bag-like member 77 is compressed with the air of its interior and the sponge 79. The air flows out of the bag-like member 77 through the flow passage 20 to the atmospheric side, and at this time, the outflow resistance of the air is generated. Consequently, a basic acting effect about reducing the landing shock is identical to those of the first and the second embodiments.

On the contrary, in the landing shock absorbing device 18 of the present embodiment, the sponge 79 is accommodated in the bag-like member 77, resulting in having the following effects. That is to say, when the bag-like member 77 is compressed with the sponge 79, not only the bag-like member 77, but also the sponge 79 has the shape restoring force, and hence the bag-like member 77 is quickly inflated into the natural state by lifting the leg 3. Additionally, the sponge 79 is filled in the bag-like member 77, thereby avoiding a portion of the bag-like member 77 from having an excessive curvature when the bag-like member 77 is compressed. As a result, a situation that the bag-like member 77 is broken by the compression may be prevented. Furthermore, in the compression of the bag-like member 77, when the air in holes of the sponge 79 flow out of the sponge 79, the flow resistance is generated, and resultingly, the damping effect of the landing shock absorbing device 18 of the present embodiment may be enhanced. Moreover, sounds generated at the time that the air in the bag-like member 77 flows out through the flow passage 20 during the compression of the bag-like member 77 are absorbed by the sponge 79 to some degree, and hence a silencing effect may be obtained.

Further, in the present embodiment, the sponge 79 is adapted to be accommodated in substantially throughout the interior portion of the bag-like member 77, but the sponge may also be spread and filled at a plurality of regions in the interior portion of the bag-like member 77 (for example, four corners of the bag-like members 77). Additionally, in the interior portion of the bag-like member 19 each provided in the first and the second embodiments, a sponge may also be accommodated as in the thirteenth embodiment.

In each embodiment described above, single bag-like members 19, 77 are provided in the foot mechanisms 6, but a plurality of bag-like members may also be provided. For example, as shown in FIG. 20(a) to FIG. 20(d), bag-like members 80 in a shape similar to the bag-like member 19 in the first and second embodiments may also be provided in a plurality of locations on the bottom face side of a foot plate member 12 of a foot mechanism (the fourteenth embodiment). Each of FIG. 20(a) to FIG. 20(d) is a model plan view viewed from the bottom face side of the foot plate member 12. Further, in this situation, inflow/outflow means for allowing the air to flow into and flow out of each bag-like member 80 may be constructed of a plurality of flow-passing holes drilled in the foot plate member 12 to communicate with the interior portion of each bag-like member 19 (corresponding to the flow passage 20 in the first and second embodiments), respectively. When a plurality of bag-like members are provided in this fashion, in the case that some bag-like members 80 of the plurality of bag-like members 80 are compressed according to a posture relationship between the foot mechanism and the floor during the landing motion of the leg, a moment about the axis of the horizontal direction is generated in the foot mechanism. Accordingly, the posture control of the foot mechanism by the compliance operation control functions immediately after any one of the plurality of the bag-like members 80 makes contact with the ground, and resultingly, an effect of the compliance motion control may be enhanced.

Further, when the plurality of the bag-like members 80 are provided as described above, all of these bag-like members 80 or some of the bag-like members 80 may also be communicated with each other through a flow passage having a throttle or the like. Additionally, for example, the plurality of the bag-like members may also be configured by dividing the interior portion of the bag-like member in a shape like the thirteenth embodiment with partition walls.

Additionally, a portion of a passage for flowing the air into the bag-like member provided in each embodiment described above (for example, fluid conduits 34, 41, 46, 53, and 68 in the fifth to the eleventh embodiments) may also be configured by a space in the interior portion of each leg 3 (including the interior portion of the respective joints 7 through 9) or the space in the interior portion of the upper body 2. This allows the air flowing into the bag-like member to cool down the actuator and the electric circuit in the interior portion of the upper body and each leg 3.

INDUSTRIAL APPLICABILITY

As described above, the present invention is useful to provide a landing shock absorber that can smoothly reduce an impact load during a landing motion of a leg of a legged mobile robot such as a biped mobile robot in a light-weight configuration.

The invention claimed is:

1. A landing shock absorbing device of a legged mobile robot moving by lifting and landing motions of a plurality of legs that can make contact with the ground through a ground-contacting face portion of a foot mechanism, respectively, comprising:
    a variable capacity element provided in the foot mechanism of each leg, each variable capacity element being compressed by undergoing a floor reaction force during the landing motion of an associated leg and being inflatable when no longer undergoing the floor reaction force at least by the lifting motion of the associated leg, thereby allowing compressible fluid to flow into the variable capacity element with the inflation thereof and to flow out of an interior portion of the variable capacity element with the compression thereof, and
    an inflow/outflow means for communicating the compressible fluid into the variable capacity element while inflating the variable capacity element in a lifting state of the associated leg and for communicating the compressible fluid out of the variable capacity element with the compression of the variable capacity element caused by the floor reaction force,
    wherein outflow resistance is generated during the outflow of the compressible fluid from the variable capacity element by the inflow/outflow means, and
    wherein the inflow/outflow means is configured such that inflow resistance of the compressible fluid into the variable capacity element is lower than outflow resistance of the compressible fluid from the variable capacity element.

2. The landing shock absorbing device of a legged mobile robot according to claim 1, wherein the variable capacity element is constructed of a deformable bag member provided on a bottom face side of an associated foot mechanism to make contact with the ground ahead of the ground-contacting face portion of the associated foot mechanism of the associated leg during the landing motion of said associated leg.

3. The landing shock absorbing device of a legged mobile robot according to claim 2, wherein the bag member is constructed by using an elastic material so as to provide a restoring force toward an inflating direction thereof.

4. The landing shock absorbing device of a legged mobile robot according to claim 2, wherein each of said variable capacity elements comprise a plurality of the bag-like members.

5. A landing shock absorbing device of a legged mobile robot according to claim 4, wherein the legged mobile robot is a robot in which a position and a posture of the foot mechanism are controlled by compliance control so as to allow a moment about an axis in a horizontal direction for the floor reaction force acting on the foot mechanism of each leg to follow a predetermined desired moment.

6. The landing shock absorbing device of a legged mobile robot according to claim 2, wherein a porous element, inflatable together with the bag-like member, is accommodated in an interior portion of the bag-like member.

7. The landing shock absorbing device of a legged mobile robot according to claim 1, wherein the inflow/outflow means is provided with upper limit pressure limiting means for limiting pressure in the variable capacity element to be equal to or less than a predetermined upper limit pressure.

8. The landing shock absorbing device of a legged mobile robot according to claim 7, wherein the upper limit pressure limiting means is disposed such that the upper limit pressure can variably be adjusted.

9. The landing shock absorbing device of a legged mobile robot according to claim 1, wherein the inflow/outflow means is disposed such that the outflow resistance of the compressible fluid from the variable capacity element can variably be adjusted.

10. The landing shock absorbing device of a legged mobile robot according to claim 1, wherein the inflow/outflow means may direct the compressible fluid out of the variable capacity element and direct the compressible fluid into the variable capacity element through a common flow passage communicating with the variable capacity element.

11. The landing shock absorbing device of a legged mobile robot according to claim 1, wherein the inflow/outflow means is provided with means for increasing pressure in the variable capacity element in an inflated state of the variable capacity element higher than atmospheric pressure.

12. The landing shock absorbing device of a legged mobile robot according to claim 11, further comprising means for limiting a capacity of the variable capacity element in the inflated state to be equal to or less than a predetermined upper limit capacity.

13. The landing shock absorbing device of a legged mobile robot according to claim 1, wherein the compressible fluid is air and the inflow/outflow means is provided with means for directing the air in the variable capacity element out into the atmosphere when the variable capacity element is compressed, and for directing the air from the atmosphere into the variable capacity element when the variable capacity element is inflated.

14. A landing shock absorbing device of a legged mobile robot according to claim 1, wherein the legged mobile robot is a robot in which a position and a posture of the foot mechanism are controlled by compliance control so as to allow a moment about an axis in a horizontal direction for the floor reaction force acting on the foot mechanism of each leg to follow a predetermined desired moment.

* * * * *